(12) United States Patent
Peterson et al.

(10) Patent No.: US 6,901,432 B2
(45) Date of Patent: May 31, 2005

(54) TRANSLATOR APPARATUS FOR TWO COMMUNICATION NETWORKS

(75) Inventors: Clyde O. Peterson, Plum Borough, PA (US); John C. Schlotterer, Murrysville, PA (US); Joseph C. Engel, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 717 days.

(21) Appl. No.: 09/994,901

(22) Filed: Nov. 27, 2001

(65) Prior Publication Data

US 2003/0126222 A1 Jul. 3, 2003

(51) Int. Cl.$^7$ .............................................. G06F 15/16
(52) U.S. Cl. ...................... 709/208; 709/209; 709/246
(58) Field of Search ................................ 709/246, 208, 709/230, 247, 209; 713/300, 310

(56) References Cited

U.S. PATENT DOCUMENTS

| | | |
|---|---|---|
| 4,644,547 A | 2/1987 | Vercellotti et al. |
| 4,644,566 A | 2/1987 | Vercellotti et al. |
| 4,653,073 A | 3/1987 | Vercellotti et al. |
| 5,270,898 A | 12/1993 | Elms et al. |
| 5,315,531 A | 5/1994 | Oravetz et al. |
| 5,548,523 A | 8/1996 | Wehrli, III et al. |
| 5,627,716 A | 5/1997 | Lagree et al. |
| 5,815,364 A | 9/1998 | Hurley et al. |
| 5,862,391 A | 1/1999 | Salas et al. |
| 6,055,145 A | 4/2000 | Lagree et al. |
| 6,301,527 B1 * | 10/2001 | Butland et al. ............. 700/286 |
| 6,301,610 B1 * | 10/2001 | Ramser et al. ............. 709/208 |

OTHER PUBLICATIONS www.modicon.com/techpubs/intr7.html, "Chapter 1 Modbus Protocol", 1–11 pp.; Oct. 22, 2001.
www.modicon.com/techpubs/dcon7.html, "Chapter 2 Data and Control Functions", 1–32 pp.; Oct. 22, 2001.
GE Electrical Distribution & Control, DET–136A, "Power Leader™ Modbus® Concentrator", 1995, 4 pp.
Eaton/Cutler–Hammer, "IL 17384–IMPACC System Communications", Mar. 1998, Section 1 Introduction, pp. 1–2; Section 2, pp. 1–2; Section 3, pp. 1–2; Section 4, pp. 1–4; Section 5, pp. 1–58.

* cited by examiner

Primary Examiner—Mehmet B. Geckil
(74) Attorney, Agent, or Firm—Martin J. Moran

(57) ABSTRACT

A translator apparatus includes a first transceiver for a Modbus RTU network having a register map of values, and a second transceiver for an INCOM network of INCOM devices having a plurality of different maps of objects and INCOM commands. A processor includes first and second interfaces to the respective first and second transceivers, and a communication routine adapted to: receive a request based upon the register map through the first transceiver related to the INCOM device objects which are responsive to different INCOM commands, send an INCOM command related to one or more of the INCOM device objects through the second transceiver, receive a response based upon the command through the second transceiver related to the INCOM device objects, and send a response based upon the register map through the first transceiver related to the INCOM device objects.

17 Claims, 9 Drawing Sheets

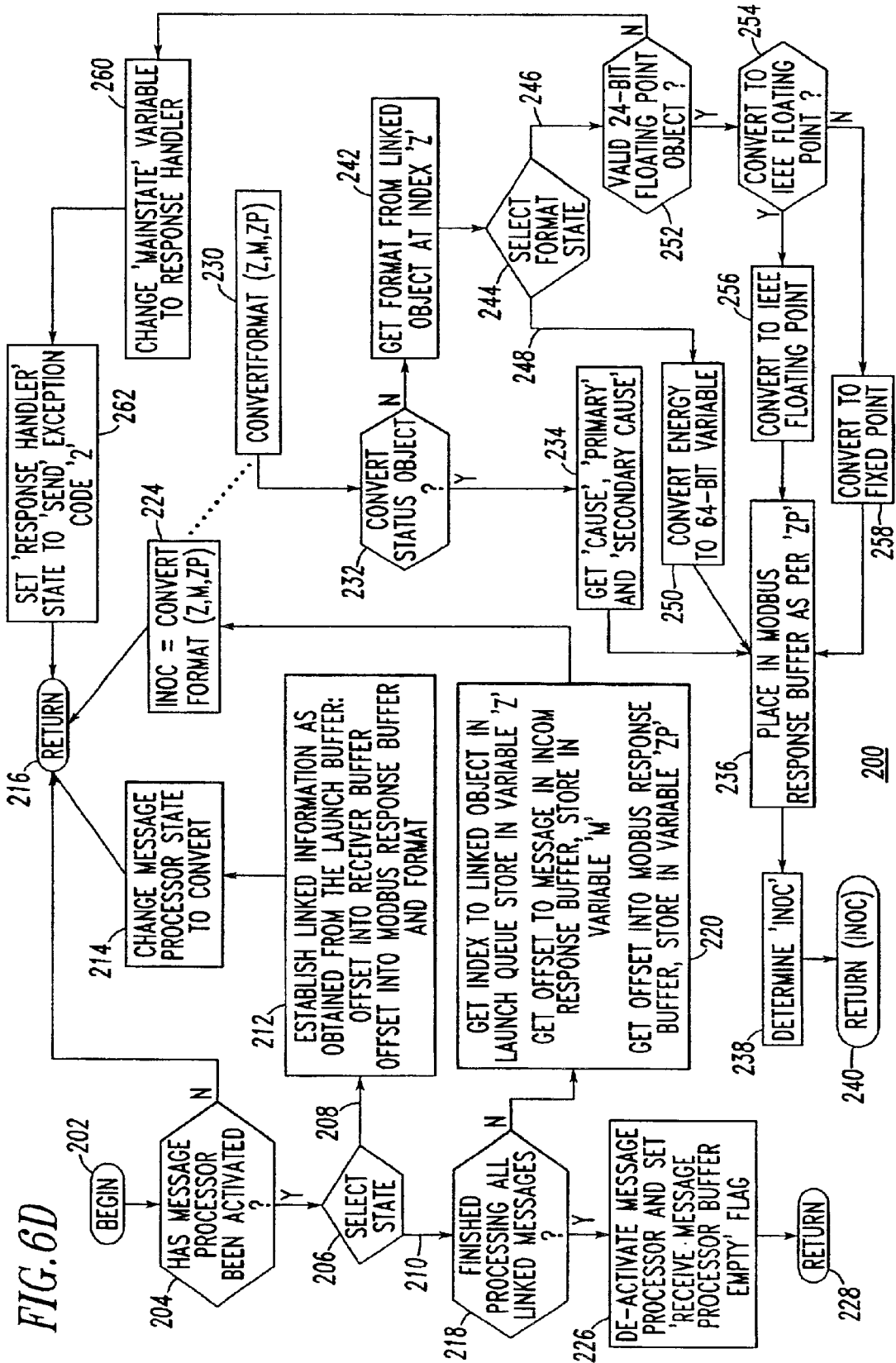

TRANSLATOR APPARATUS FOR TWO COMMUNICATION NETWORKS

BACKGROUND OF THE INVENTION

1. Field of the Invention

This invention relates to translator apparatus and, more particularly, to such a translator apparatus for two communication networks.

2. Background Information

In power management control and data acquisition systems, a variety of power monitoring or control devices are connected to a common bus, which allows such devices to communicate with a server. One standard protocol employed for communicating between the server and the power control and monitoring devices is the Modbus RTU standard. A wide range of commercially available Modbus RTU Servers may be employed for a variety of applications. For example, all major electrical distribution companies have a similar product. Typically, the servers may support any generic Modbus RTU compliant device.

For example, as shown in FIG. 1, a programmable logic controller (PLC) Modbus RTU master 2 communicates with up to about 32 or 64 Modbus slaves 4,6,8 (e.g., overload relays, meters, circuit breakers) over an RS-485 based communication channel 10.

U.S. Pat. No. 5,862,391 discloses a Modbus concentrator, which is generally a multiple channel data converter/multiplexer. The concentrator translates data between two protocols for multiple metering and protective devices (i.e., between General Electric's Commnet peer-to-peer network protocol and the industry standard Modbus RTU protocol). The concentrator acts as a pseudo host for Commnet devices and as a pseudo slave for each device in the Modbus RTU network. The concentrator creates virtual Modbus devices for every physical Commnet device attached to its multiple channels. Multiple channels allow parallel processing for data conversion, improving the throughput of the network in which it is utilized. Further, the concentrator auto-configures itself by seeking all the devices attached in the Commnet channels and storing this information in a configuration database, which is used to determine address conflicts among the attached Commnet devices.

Existing Modbus slaves have identical variables (e.g., phase A current, $I_A$; phase A-B line-to-line voltage, $V_{AB}$) or constant parameters in various Modbus registers. Such variables or constant parameters are not only inconsistent from one manufacturer of Modbus slaves to other manufacturers of Modbus slaves, but are also inconsistent from one Modbus slave to another Modbus slave of the same manufacturer. Hence, for various Modbus slaves, there is a separate Modbus register map listing the Modbus registers where the specific variables or constant parameters exist. For example, the phase A current, $I_A$, may be at one register (e.g., 12A4H) for a first product and may be at a second different register (e.g., 1145H) for a second product. Accordingly, programming a Modbus master is both time consuming and potentially error prone, since for various Modbus slave devices, the same variable or constant parameter may exist in a different register location with respect to the other various Modbus slaves. Hence, there exists the possibility that each query for an identical variable or constant parameter will be different.

The INCOM (INdustrial COMmunications) Network provides two-way communication between an INCOM network master and a variety of products such as, for example, electrical interrupting devices, circuit breakers, digital meters, motor overload relays, monitoring units and a wide range of industrial products. Control and monitoring is carried out over a network consisting of dedicated twisted pair wires. Preferably, a semi-custom integrated circuit provides a simple, low cost interface to the network. For example, a Sure Chip Plus™ microcontroller enables the electrical interrupting device to communicate with the INCOM network. This integrated circuit provides various network functions such as, for example, carrier generation and detection, data modulation/demodulation, address decoding, and generation and checking of a 5-bit cyclic redundant BCH error code.

An INCOM communication module, which may be otherwise known as a PONI "Product Operated Network Interface," may act as an interface device between a remote personal computer PC and the electrical meter, protector or control communicating device that does not have a built-in INCOM transceiver.

The INCOM network employs a simple two-wire asynchronous communication line, which is daisy chained to the several devices. A master device digitally addresses each of the slave devices in a master/slave relationship for the purpose of gathering the data generated by the individual units for central processing. An INCOM network can have one master and up to 1000 slaves. The INCOM communications protocol is based on 33-bit message packets. A typical INCOM network transaction consists of one or more 33-bit message packets transmitted by the master, and one or more 33-bit message packets transmitted by a slave in response.

Examples of the INCOM network and protocol are disclosed in U.S. Pat. Nos. 4,644,547; 4,644,566; 4,653,073; 5,315,531; 5,548,523; 5,627,716; 5,815,364; and 6,055,145, which are incorporated by reference herein.

The assignee of the present invention has undertaken the design of new products (i.e., Plug-'n-Play (or PnP) products), which respond to the INCOM protocol, in order to return the same objects (e.g., phase A current, phase B voltage) using the same set of corresponding INCOM commands. This provides a consistent set of commands to obtain identical objects from INCOM devices. Nevertheless, there exists various legacy products, which have an inconsistent command structure and which return the same objects using a different set of corresponding INCOM commands. For example, one legacy product returns phase A current with one INCOM command, while a second legacy product returns the same current with a different INCOM command.

Any suitable computer or programmable device (e.g., with an RS-232C communications port; PC XT/AT bus) may function as an INCOM network master. An RS-232C based INCOM network master employs a gateway device such as the MINT (Master INCOM Network Translator). The gateway device converts the 10 byte ASCII encoded hexadecimal RS-232C messages to or from 33-bit binary messages used on the INCOM local area network.

An IBM XT or AT compatible personal computer alternatively employs the CONI (Computer Operated Network Interface) for interfacing to the INCOM network. The CONI employs a direct PC-bus interface, which provides a more efficient network interface than that of the MINT.

There are two basic types of INCOM messages: control messages and data messages. The messages are 33 bits in length and are sent with the Least Significant Bit (LSB) first.

The INCOM chip generates a number of the bits including the Start bits, Stop bit and BCH error detection code. The format for an INCOM-control message is shown in Table 1.

TABLE 1

| Bit Number(s) | Mnemonic | Definition |
| --- | --- | --- |
| 1–0 | STR | Start Bits = 11 |
| 2 | C/D | Control Bit = 1 for Control Messages |
| 6–3 | INST | Instruction Field |
| 10–7 | COMM | Command Field |
| 22–11 | ADDRESS | Address of Product (Slave Device) |
| 26–23 | SCOMM | SubCommand Field |
| 31–27 | BCH | BCH error detection field |
| 32 | STP | Stop Bit = 0 |

The format for an INCOM-Data message is shown in Table 2.

TABLE 2

| Bit Number(s) | Mnemonic | Definition |
| --- | --- | --- |
| 1–0 | STR | Start Bits = 11 |
| 2 | C/D | Control Bit = 0 for Data Messages |
| 10–3 | BYTE0 | 8-bit data field (Bit 3 = b0) |
| 18–11 | BYTE1 | 8-bit data field (Bit 11 = b0) |
| 26–19 | BYTE2 | 8-bit data field (Bit 18 = b0) |
| 31–27 | BCH | BCH error detection field |
| 32 | STP | Stop Bit = 0 |

There are two types of INCOM slave devices (products): a stand-alone slave, and an expanded mode slave. The stand-alone slave is a device on an INCOM network that can control one digital output and monitor up to two status (digital) inputs. An example of a stand-alone slave device is an addressable relay marketed by Eaton/Cutler-Hammer of Pittsburgh, Pa. A stand-alone slave device uses INCOM control messages exclusively for communications.

The expanded mode slave is a device on an INCOM network that can send and/or receive data values over the INCOM network including, for example, analog and digital I/O data, configuration or setpoint information, and trip data. Examples of such devices include IQ Data Plus II Line Metering Systems, Digitrip RMS 700 and 800 Trip Units, and IQ 1000 and IQ 500 Motor Protection Systems, all marketed by Eaton/Cutler-Hammer. An expanded mode slave device uses INCOM control messages and INCOM data messages for communications.

There are seven examples in which an expanded mode slave product, in response to a command from the master, may send a return-command message to the master. These include: (1) Acknowledge (ACK) Reply; (2) Negative Acknowledge (NACK) Reply; (3) Product Buffer Not Yet Available; (4) Sub-network Product Not Responding; (5) Checksum Error; (6) Downloaded Value Out of Range; and (7) Product Not in a State That Allows the Requested Action.

Some INCOM commands require the product to transmit an acknowledge (ACK) message. The positive acknowledge indicates that the product accepted the present command or the data transmission was completed successfully. The format of the ACK message, ignoring the Start bits, Stop bit and BCH error detection code, includes: (1) C/D=1; (2) INST=3; (3) COMM=1; (4) ADDRESS=address of slave (some products may employ address 000H or FFFH; other products can assume any address in the 12 bit address space); and (5) SCOMM=0. The product will transmit a negative acknowledge (NACK), rather than an ACK, in response to certain conditions. The negative acknowledge indicates that the product has not accepted the COMM and SCOMM command request. The format of the NACK message, ignoring the Start bits, Stop bit and BCH error detection code, includes: (1) C/D=1; (2) INST=3; (3) COMM=1; (4) ADDRESS=address of slave (some products may employ address 000H or FFFH; other products can assume any address in the 12 bit address space); and (5) SCOMM=1.

For example, some conditions for which a product will respond with a NACK include: (1) the product received an INCOM control message that it does not recognize (e.g., an INCOM control message with INST=3, and COMM and SCOMM values that it does not support); and (2) the PONI received an INCOM control message that it cannot process due to a communications failure between the PONI and the product. Products only respond to INCOM messages containing a good BCH value.

Examples of standard master-to-slave commands for the Integrated Monitoring, Protection, And Control Communication (IMPACC) protocol are shown below, in Table 3. All of these commands employ C/D=1 and, thus, only the INST, COMM, and SCOMM specifications are provided. The words transmit and receive in the command definitions are with respect to the product. If the message is a transmit command, then the result will be the transmission of data from the product to the master. On the other hand, a receive command that is transmitted from the master to the product will be followed by data transmissions from the master, which are to be received by the product. Table 3 shows six classes of standard master-to-expanded mode slave commands.

TABLE 3

| Command | INST | COMM | SCOMM |
| --- | --- | --- | --- |
| Standard slave-buffer transmissions | 3 | 0 | 0–F |
| Standard system management buffer transmissions | 3 | A | 3–7 |
| Product specific slave-buffer transmissions | 3 | C | 8–F |
| Standard slave actions | 3 | D | 0, 1, 3 |
| Standard master-buffer transmissions | 3 | D | 8–F |
| Product specific master-buffer transmissions | 3 | F | 8–F |
| Broadcast Command | D | 0–F | 0–F |

A few examples of these communications data buffers are discussed, below. A standard data buffer includes a specification for the formatting of analog data in engineering units. For example, the IMPACC 24-Bit Floating Point Number Format permits the IMPACC family to include a number of products that send similar analog parameters (e.g., currents, voltages). Each parameter is sent as a single data transmission with the three bytes defined as follows: (1) BYTE0 is the low-order byte of 16-bit magnitude; (2) BYTE1 is the high-order byte of 16-bit magnitude; and (3) BYTE2 is the scale byte, wherein the BYTE2 bit definitions (b7–b0) are as follows: (a) for bit b7: 0 indicates that the value in BYTE0 and BYTE1 is a 16-bit unsigned integer, and 1 indicates that the value in BYTE0 and BYTE1 is a 16-bit signed integer; (b) for bit b6: 0 indicates that the data is invalid, and 1 indicates that the data is valid; (c) for bit b5: 0 indicates a multiplier as a power of 2, and 1 indicates a multiplier as a power of 10, and (d) the bits b4–b0 represent the multiplier's exponent in 5-bit signed integer form. This allows a magnitude of multiplier to range from $2^{-16}$ to $2^{+15}$ (for b5=0), or $10^{-16}$ to $10^{+15}$ (for b5=1).

Table 4 shows the Standard Expanded Mode Slave-Buffer Transmissions (for COMM=0 and SCOMM=0–F).

TABLE 4

| INST | COMM | SCOMM | Command Definition |
|---|---|---|---|
| 3 | 0 | 0 | Transmit Fast-Status. |
| 3 | 0 | 3 | Transmit All Standard Buffers |
| 3 | 0 | 5 | Transmit Current Buffer |
| 3 | 0 | 6 | Transmit Line-to-Line Voltage Buffer |
| 3 | 0 | 7 | Transmit Line-to-Neutral Voltage Buffer |
| 3 | 0 | 8 | Transmit Power Buffer(1) |
| 3 | 0 | 9 | Transmit Power Buffer(2) |
| 3 | 0 | A | Transmit Energy Buffer |
| 3 | 0 | B | Transmit Saved Energy Buffer |
| 3 | 0 | C | Transmit Saved Reactive Energy Buffer |
| 3 | 0 | F | Receive Expanded Transmit Buffer Number |

Table 5 shows the Buffer Numbers for the Receive Expanded Transmit Buffer Number command (for COMM=0 and SCOMM=F).

TABLE 5

| Buffer No. | Buffer Description |
|---|---|
| N = 1 | Transmit Temperature Buffer |
| N = 2 | Transmit Demand Currents Buffer |
| N = 3 | Transmit Current Buffer |
| N = 4 | Transmit Line-Line Voltage Buffer |
| N = 5 | Transmit Line-Neutral Voltage Buffer |
| N = 6 | Transmit Power Buffer |
| N = 7 | Transmit Per-Phase Power Buffer |
| N = 8 | Transmit System Energy Buffer |
| N = 9 | Transmit THD Buffer |
| N = 10 | Transmit Demand Current Buffer (w/ time stamp) |
| N = 11 | Transmit Per-Phase Demand Current Buffer (w/ time stamp) |
| N = 12 | Transmit Demand Power Buffer (w/ time stamp) |
| N = 13 | Transmit Min/Max Current Buffer (w/ time stamp) |
| N = 14 | Transmit Min/Max L-L Voltage Buffer (w/ time stamp) |
| N = 15 | Transmit Min/Max L-N Voltage Buffer (w/ time stamp) |
| N = 16 | Transmit Min/Max PF-Displacement Buffer (w/ time stamp) |
| N = 17 | Transmit Min/Max PF-Apparent Buffer (w/ time stamp) |
| N = 18 | Transmit Min/Max Power/Frequency Buffer (w/ time stamp) |
| N = 19 | Transmit Min/Max Current % THD Buffer (w/ time stamp) |
| N = 20 | Transmit Min/Max Voltage % THD Buffer (w/ time stamp) |
| N = 21 | Transmit Crest Factor Buffer |
| N = 22 | Transmit Min/Max per-phase real power (w/ time stamp) |
| N = 23 | Transmit Min/Max per-phase reactive power (w/ time stamp) |
| N = 24 | Transmit Min/Max per-phase VA (w/ time stamp) |
| N = 25 | Transmit Min/Max Currents Buffer (w/o time stamp) |
| N = 26 | Transmit Demand Currents Buffer (w/o time stamp) |
| N = 27 | Transmit Demand Power Buffer (w/o time stamp) |
| N = 28 | Transmit Min/Max Voltage Buffer (w/o time stamp) |
| N = 29 | Transmit Min/Max Power/Frequency/PF Buffer (w/o time stp.) |
| N = 30 | Transmit Min/Max Current % THD Buffer (w/o time stamp) |
| N = 31 | Transmit Min/Max Voltage % THD Buffer (w/o time stamp) |
| N = 32 | Transmit Min/Max Current THD Magnitude Buf. (w/ time stp.) |
| N = 33 | Transmit Min/Max Voltage THD Magnitude Buf. (w/ time stp.) |
| N = 34 | Transmit Whole Load Center Energy Buffer |

The Transmit All Standard Buffers command definition (3 0 3 of Table 4) covers the standard buffers as defined by INST=3, COMM=0, and SCOMM=5 through A.

The Transmit Current Buffer (3 0 5 of Table 4) response consists of four data messages, each containing an IMPACC 24-bit Floating Point Number, with the current units being expressed in amperes. The four messages respectively include: (1) phase current IA; (2) phase current IB; (3) phase current IC; and (4) current IX, which is usually ground current, although for some products there is no ground current and the current IX may be either a fourth pole current or a neutral current.

The Transmit Line-to-Line Voltage Buffer (3 0 6 of Table 4) response consists of three data messages, each containing an IMPACC 24-bit Floating Point number, with the voltage units being expressed in volts. The three messages respectively include: (1) line-to-line voltage VAB; (2) line-to-line voltage VBC; and (3) line-to-line voltage VCA.

The Transmit Line-to-Neutral Voltage Buffer (3 0 7 of Table 4) response consists of three data messages, each containing an IMPACC 24-bit Floating Point number, with voltage units being expressed in volts. The three messages respectively include: (1) line-to-neutral voltage VAN; (2) line-to-neutral voltage VBN; and (3) line-to-neutral voltage VCN.

The Transmit Expanded Buffer (3 0 F of Table 4) command allows for the use of additional standard responses beyond those covered by INST=3, COMM=0, and SCOMM=3 to E. The Expanded Buffer command consists of the following communications sequence. First, the Master sends the Slave a Transmit Expanded Buffer Number command. Second, the Slave responds with an ACK. Next, the Master sends the Slave a single data message containing the expanded buffer number. Finally, the Slave sends the requested buffer as a series of data messages. The first byte, BYTE0, of the first data message specifies the total number data messages (e.g., up to about 43) to be sent. The expanded buffer number, N, is sent as a 24 bit binary number.

For example, for the Currents Buffer (N=3), there are seven data messages including: (1) Number of additional messages (BYTE0=6); (2) Phase A current; (3) Phase B current; (4) Phase C current; (5) Ground current; (6) Neutral current; and (7) Average phase current.

There is room for improvement in translator apparatus for communication networks.

SUMMARY OF THE INVENTION

There exists the need to consistently pass objects from slave legacy products and PnP (Plug-'n-Play) products to Modbus RTU registers. The present invention eliminates the variability in slave register maps and slave object/command maps, which can be prone to user error, and also minimizes the amount of documentation needed for an entire line of Modbus slaves. The present invention is directed to a translator apparatus for a first communication network, such as a Modbus RTU network having a register map of values, and a second communication network, such as an INCOM network having a plurality of slave INCOM devices with diverse object/command assignments, or such as a Modbus RTU network having a plurality of slave devices with diverse register maps of values.

As one aspect of the invention, a translator apparatus comprises: a first transceiver adapted to interface a first communication network having a register map of values; a second transceiver adapted to interface a second communication network having a plurality of slave devices, the slave devices having a plurality of different maps of objects and commands; and a processor comprising: a first interface to the first transceiver, a second interface to the second transceiver, and a communication routine adapted to: receive a request based upon the register map through the first transceiver related to at least one of the objects of one of the slave devices, the at least one of the objects of one of the slave devices being responsive to a first command, the at least one of the objects of another one of the slave devices being responsive to a different second command, send a command through the second transceiver related to the at least one of the objects of one of the slave devices, the command being selected from a corresponding one of the maps of objects and commands, receive a response based upon the command through the second transceiver related to the at least one of the objects of one of the slave devices, and send a response based upon the register map through the first transceiver related to the at least one of the objects of one of the slave devices.

As another aspect of the invention, a translator apparatus comprises: a first transceiver adapted to interface a Modbus RTU network having a first register map of values; a second transceiver adapted to interface a slave communication network having a plurality of slave devices, the slave devices having at least one second register map of values, the second register map being different from the first register map of values; and a processor comprising: a first interface to the first transceiver, a second interface to the second transceiver, and a communication routine adapted to: receive a request based upon the first register map through the first transceiver related to at least one of the values of one of the slave devices, the at least one of the values of one of the slave devices having a first position in the first register map and a second different position in the second register map, send a request based upon the second register map through the second transceiver related to the at least one of the values of one of the slave devices, receive a response based upon the second register map through the second transceiver related to the at least one of the values of one of the slave devices, and send a response based upon the first register map through the first transceiver related to the at least one of the values of one of the slave devices.

BRIEF DESCRIPTION OF THE DRAWINGS

A full understanding of the invention can be gained from the following description of the preferred embodiments when read in conjunction with the accompanying drawings in which:

FIGS. 6A–6C, 6D and 7 are flowcharts of the query handler, the message processor and the query response handler, respectively, of the processor of the Modbus Master INCOM Network Translator Module of FIG. 4.

DESCRIPTION OF THE PREFERRED EMBODIMENTS

The invention will be described as applied to a network translator between a Modbus RTU network and an INCOM (INdustrial COMmunications) network marketed by Eaton/Cutler-Hammer, although the invention is applicable to a network translator between a first communication network, such as a Modbus RTU network, and any suitable slave or native language network (e.g., without limitation, INCOM; another Modbus RTU network; Multilin marketed by General Electric; DataHighway Plus marketed by Allen-Bradley; BACnet marketed by Alerton Technologies, Inc.; Modbus RTU I/O modules marketed by Arco Mag).

Figure 1:
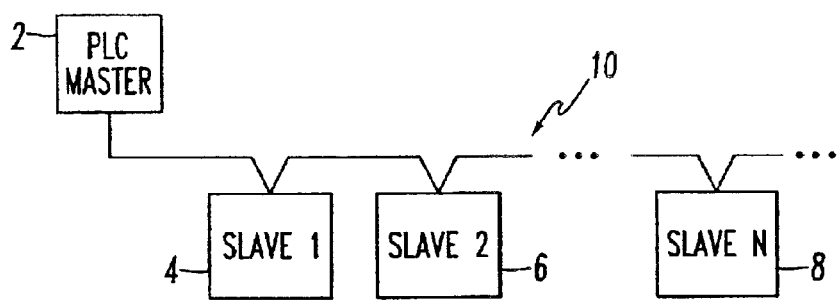
FIG. 1 is a block diagram of a programmable logic controller (PLC) Modbus RTU master and a plurality of Modbus slaves.
Figure 2:
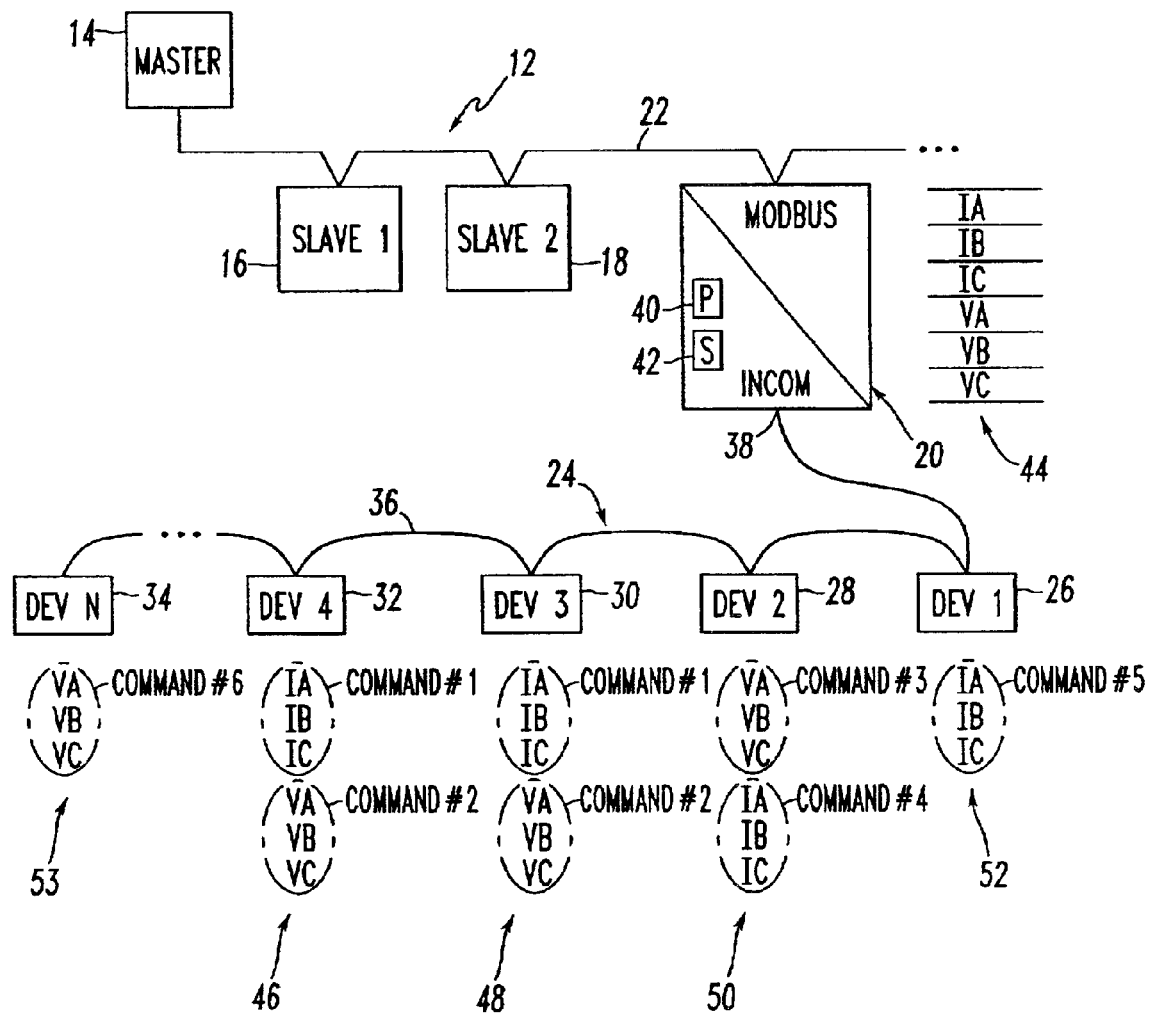
FIG. 2 is a block diagram of a Modbus Master INCOM Network Translator Module providing communication between a Modbus RTU network and a plurality of INCOM slaves in accordance with the present invention.

Referring to FIG. 2, a Modbus RTU serial network 12 includes a Modbus master 14, a plurality of Modbus slaves 16,18,20, and a Modbus network cable 22. The exemplary Modbus slave 20 is a Plug 'N Play Modbus/native language translator apparatus, which functions as a Modbus RTU network slave and a native language network master. In the exemplary embodiment, the Modbus slave 20 is a mMINT (Modbus Master INCOM Network Translator) module which provides communication between the Modbus RTU network 12 and an INCOM (INdustrial COMmunications) network 24. This mMINT module 20 is transparent to the Modbus RTU network 12. It communicates to the Modbus master 14 on the Modbus RTU network 12 using the Modbus RTU (Remote Terminal Unit) protocol. It communicates to the INCOM network 24 using the IMPACC protocol.

The exemplary native language INCOM network 24 includes the exemplary mMINT module 20, a plurality of slave devices 26,28,30,32,34, and an INCOM network cable 36. The mMINT module 20 is a slave device on the Modbus RTU network 12 and, as such, interfaces with the Modbus master 14, which exchanges register objects with the mMINT module 20.

In the exemplary embodiment, the mMINT module 20: (1) handles generic passthrough commands (Modbus/INCOM/Modbus); (2) passes register objects from legacy slave products (e.g., slaves 26,28) and newer PnP (Plug-'n-Play) slave products (e.g., slaves 30,32) to Modbus RTU registers; (3) employs data in IEEE Floating Point format and fixed point; (4) provides Modbus RTU communication data transfer rates of 1200, 9600 or 19200 baud with 1 start bit, 8 data bits and one stop bit; (5) interfaces up to 32 slave products connected to the INCOM network port 38 (up to 247 unique Modbus addresses are possible); (6) provides a flashing status LED 70 (FIG. 3) to indicate an active module; (7) employs LEDs 66,68 (FIG. 3) for INCOM transmit and receive communications exchanges; (8) employs LEDs 62,64 (FIG. 3) for Modbus RS-485 transmit and receive communications exchanges; and (9) receives input power for the module from either 120 VAC or 48 to 125 VDC.

As discussed below in connection with Table 6, the mMINT module 20 includes a primary constant array (P) 40 of commands, which is a constant array of records of native language INCOM elements employed to obtain a specific object from a slave device, which speaks the native INCOM language. The mMINT module 20 also includes a secondary constant array (S) 42 of commands.

In accordance with the present invention, the contents of Modbus registers in the single Modbus register map 44 are INCOM product objects (e.g., IA, phase A current; IB, phase B current; IC, phase C current; VA, phase A voltage; VB, phase B voltage; VC, phase C voltage). The mMINT module 20 ensures that unique objects reside in identical registers independent of the INCOM slave products 26,28,30,32,34. Consequently, for all INCOM slave products there is a single Modbus register map 44 of objects as shown, for example, below in Table 12. INCOM objects in this table occupy two registers, such as 1202H and 1203H for IEEE floating point format for IA, phase A current, and four registers, such as 18A8H, 18A9H, 18AAH and 18ABH for net energy.

The exemplary mMINT module 20 is transparent to the Modbus master 14 and responds to every address of INCOM slave products attached thereto. For example, the slave devices 26,28,30,32,34 may have INCOM product addresses 10,15,20,22,247, respectively. As a result, the mMINT module 20 is responsive to corresponding Modbus network addresses 10,15,20,22,247, respectively, in the RTU communications mode. As a further example, the Modbus slave devices 16,18 may be response to Modbus network addresses 21,23, respectively, and there are, thus, no mMINT slave devices at the corresponding Modbus product addresses.

The exemplary PnP INCOM slave devices 32,30 have respective object/command maps 46,48, which are consistent with the single Modbus register map 44 and Table 12. In this example, a first INCOM command is employed to read the three current objects IA, IB, IC; and a second INCOM command is employed to read the three voltage objects VA, VB, VC. On the other hand, the exemplary legacy INCOM slave devices 28,26,34 have respective object/command maps 50,52,53, which are inconsistent with the single Modbus register map 44 and Table 12. These devices employ four different INCOM commands to read the three current objects and the three voltage objects. However, in accordance with the present invention, the mMINT module 20 advantageously translates the diverse object/command assignments (e.g., without limitation, maps (1) 46,48; (2) 50; and (3) 52 of FIG. 2) of the slave INCOM devices in order to provide the single Modbus register map 44 for communications between the Modbus master 14 through the mMINT module 20 and with the legacy INCOM slave devices 26,28.

Figure 3:
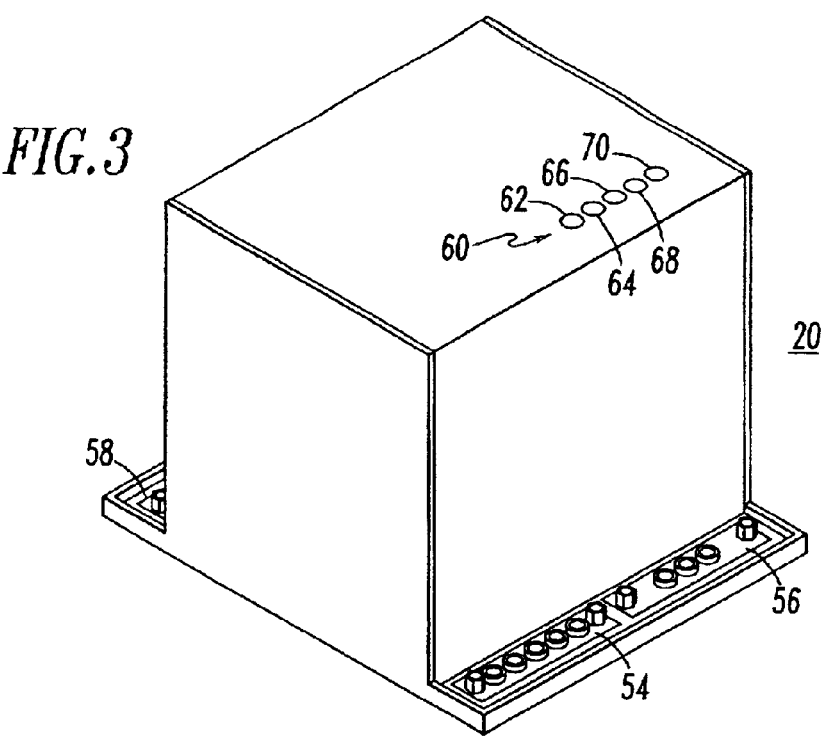
FIG. 3 is an isometric view of the Modbus Master INCOM Network Translator Module of FIG. 2.

As shown in FIG. 3, the mMINT module 20 includes three connectors 54,56,58. In the exemplary embodiment, the connector 54 is a 5-pin input power connector in which pin 1 is chassis ground, pins 2 and 3 are VAC neutral (or VDC common), and pins 4 and 5 are 120 VAC, 60 Hz (or 48–125 VDC). The INCOM connector 56 is a 3-pin connector, which provides the interface to the INCOM network 24 of FIG. 2. Pins 1 and 2 are the INCOM carrier network twisted pair, and pin 3 is the shield. The shield wire is connected to ground at the INCOM network port 38 (FIG. 2) end only. The shielding is interconnected where the slave devices 26,28,30,32,34 are daisy chained. The Modbus RS-485 connector 58 is a 5-pin connector, which provides the interface to the Modbus RTU network 12 of FIG. 2. Pin 1 is the RS-485 Network-A non-inverting differential connection, and pin 2 is the RS-485 Network-B inverting differential connection for the Modbus RTU network 12. Pin 3 is common, pin 4 is the shield, and pin 5 is not used.

FIG. 3 also shows five exemplary status LEDs 60 (e.g., green) for the mMINT module 20. The Modbus RS-485 Network Rx LED 62 is lighted whenever the module is receiving from the Modbus RTU network 12 of FIG. 2. The Modbus RS-485 Network Tx LED 64 is lighted whenever the module is transmitting on the Modbus RTU network. The INCOM Network Rx LED 66 is lighted whenever the module 20 is receiving from the INCOM network 24 of FIG. 2. The INCOM Network Tx LED 68 is lighted whenever the module is transmitting on the INCOM network. The Status LED 70 is flashing whenever the module 20 is powered up and when the module's micro-controller 72 of FIG. 4 is executing instructions.

Figure 4:
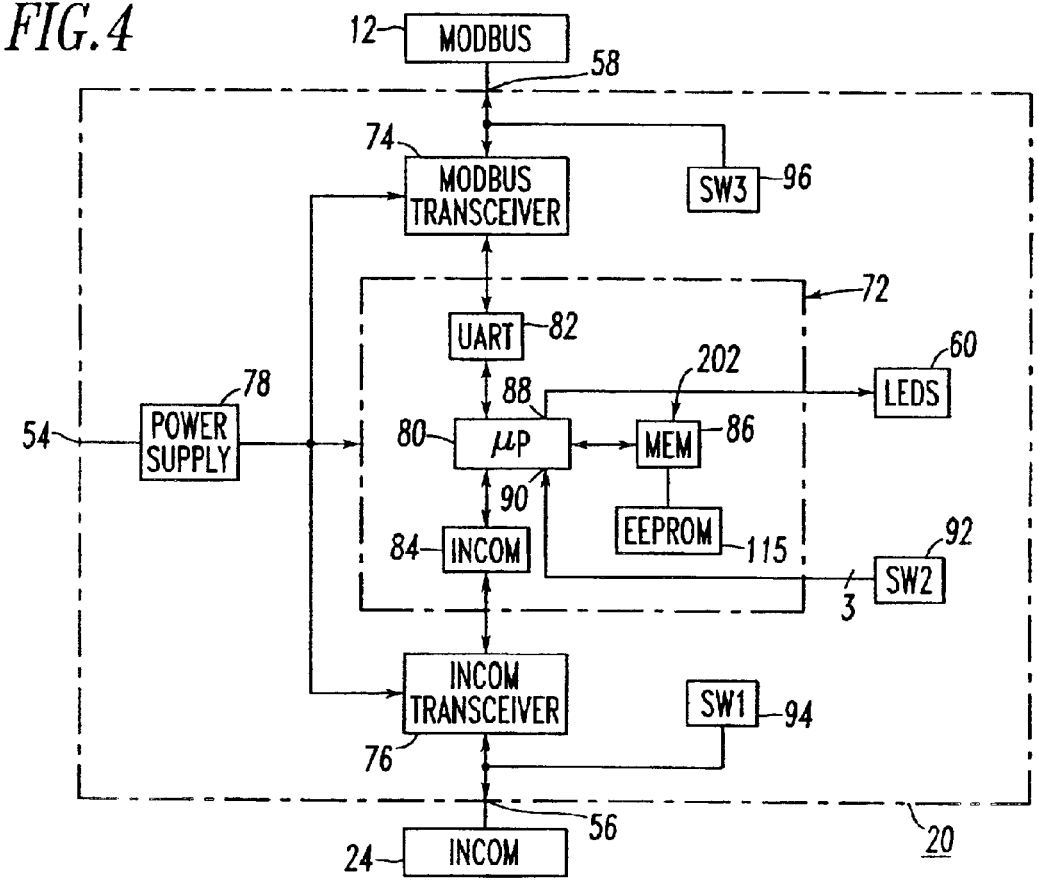
FIG. 4 is a block diagram in schematic form of the Modbus Master INCOM Network Translator Module of FIG. 2.

Referring to FIG. 4, the mMINT module 20 includes the micro-controller 72, a Modbus transceiver 74, an INCOM transceiver 76 and a suitable power supply 78. The micro-controller 72 includes a suitable CPU ($\mu$P) 80, a UART 82 for interfacing the Modbus transceiver 74, an INCOM port 84 for interfacing the INCOM transceiver 76, memory (MEM) 86 (e.g., RAM, non volatile RAM, stack, EEPROM, and ROM with executable code), an output port 88 for driving the LEDs 60, and an input port 90 for inputting from switch SW2 92. The Modbus transceiver 74 is adapted to interface the Modbus RTU network 12 having the Modbus register map of values 44 of FIG. 2. The INCOM transceiver 76 is adapted to interface the INCOM network 24 including the INCOM slave devices 26,28,30,32,34 having one or more different object/command maps 50,52.

Other switches SW1 94 and SW3 96 are associated with the INCOM connector 56 and the Modbus connector 58, respectively. Preferably, the switches 92,94,96 are conventional dual-inline-package (DIP) switches having a plurality of individual switches, which are accessible from the top front (not shown) of the mMINT module 20 of FIG. 3. The $\mu$P 80 also includes suitable timing and other resources for supporting communications on the two communication networks 12,24.

The INCOM termination switch (SW1) 94 (e.g., interfacing a 100 $\Omega$ termination resistor) is moved to the "ON" position only when the module 20 is the last INCOM unit in a chain of units (e.g., as shown in FIG. 2) or if it is a single unit. The Modbus RS-485 baud rate switch (SW2) 92 configures the data transfer rate for the Modbus RTU network 12. There are three exemplary switches (not shown) in switch SW2 92, two of which are moved to either the "CLOSE" (0) or the "OPEN" (1) position based on the selected baud rate (e.g., 00x=1200, 01x=9600, and 10x=19200). A third switch is for Modbus diagnostics. The mMINT module 20 can be assigned a Modbus address. For the mMINT module 20 to respond to a diagnostic query related to address 248 on the Modbus network 12, that third switch of switch SW2 92 is moved to the "OPEN" (1) position as discussed below in connection with Table 11. Otherwise, that switch is in the "CLOSE" (0) position. Finally, the Modbus Termination Dip Switch (SW3) 96 (e.g., interfacing a 121 $\Omega$ termination resistor) is moved to the "ON" position only when it is the last unit in a chain of units or if it is a single unit (not shown).

As shown below in Table 6, the primary constant array (P) 40 of FIG. 2 has an ordered sequence with respect to associated Modbus register addresses (Reg #), such that the index to a specific record is a function of the Modbus register address. Each record of this array has an element ("2ndry cmd ndx"), which contains a start index into the secondary constant array (S) 42 of FIG. 2 (Table 7, below). If there is no corresponding secondary array record, then this element is set equal to −1. As shown in Table 7, the structure of each record of the secondary constant array (S) 42 is identical to that of the primary constant array 40. However, unlike the records of the primary constant array 40, the records of the secondary constant array 42 do not have an ordered sequence with respect to associated Modbus register addresses (Reg #). Each record of this array 42 has an element ("ndx lnk"), which contains an index to the next record within this array 42, which could possibly be used to obtain the associated object. This element is equal to −1 if no additional record exists, which could possibly be used to obtain the object of interest.

TABLE 6

| Reg # IEEE | fixed point | fix pt scale | object name | cmd/ inst | sub cmd | # msgs | Expand Buf # | | | | offset bytes | frmt # | 2ndry cmd ndx |
|---|---|---|---|---|---|---|---|---|---|---|---|---|---|
| 1200 | 1800 | x1 | status | 03 | 10 | 1 | | | | | 0 | 48 | 0 |
| 1202 | 1802 | x10 | $I_A$ | 03 | F0 | 7 | 0 | 0 | 0 | 3 | 3 | 13 | 1 |
| 1204 | 1804 | x10 | $I_B$ | 03 | F0 | 7 | 0 | 0 | 0 | 3 | 6 | 13 | 2 |
| 1206 | 1806 | x10 | $I_C$ | 03 | F0 | 7 | 0 | 0 | 0 | 3 | 9 | 13 | 3 |
| 1208 | 1808 | x10 | $I_{Gnd}$ | 03 | F0 | 7 | 0 | 0 | 0 | 3 | C | 13 | 4 |
| 120A | 180A | x10 | $I_N$ | 03 | F0 | 7 | 0 | 0 | 0 | 3 | F | 13 | 4 |
| 120C | 180C | x10 | $I_{AVG}$ | 03 | F0 | 7 | 0 | 0 | 0 | 3 | 12 | 13 | -1 |
| 120E | 180E | x10 | $V_{AB}$ | 03 | F0 | 5 | 0 | 0 | 0 | 4 | 3 | 13 | 5 |
| 1210 | 1810 | x10 | $V_{BC}$ | 03 | F0 | 5 | 0 | 0 | 0 | 4 | 6 | 13 | 6 |
| 1212 | 1812 | x10 | $V_{CA}$ | 03 | F0 | 5 | 0 | 0 | 0 | 4 | 9 | 13 | 7 |
| 122A | 182A | x1 | $3_{\phi realPwr}$ | 03 | F0 | 9 | 0 | 0 | 0 | 6 | 3 | 13 | 11 |
| • | • | • | • | | • | | | | | | • | | • |
| • | • | • | • | | • | | | | | | • | | • |
| N/A | 18A0 | x10 | fwd WH | 03 | F0 | 0D | 0 | 0 | 0 | 8 | 3 | 54 | 24 |
| N/A | 18A4 | x10 | rev WH | 03 | F0 | 0D | 0 | 0 | 0 | 8 | 7 | 54 | 25 |
| N/A | 18A8 | x10 | WH | 03 | F0 | 0D | 0 | 0 | 0 | 8 | 11 | 54 | 13 |
| N/A | 18AC | x1 | ld VARh | 03 | F0 | 0D | 0 | 0 | 0 | 8 | F | 54 | -1 |
| N/A | 18B0 | x1 | lag VARh | 03 | F0 | 0D | 0 | 0 | 0 | 8 | 13 | 54 | -1 |
| N/A | 18B4 | x1 | VARh | 03 | F0 | 0D | 0 | 0 | 0 | 8 | 17 | 54 | -1 |
| N/A | 18B8 | x1 | VAhrs | 03 | F0 | 0D | 0 | 0 | 0 | 8 | 1B | 54 | 28 |
| • | • | • | • | | • | | | | | | • | | • |
| • | • | • | • | | • | | | | | | • | | • |

Table 6 includes portions of two typical primary constant arrays of commands for the exemplary INCOM native language. Table 6 assumes an exemplary base address of 40000H and, thus, for example, object $I_A$ would be at registers 41202H and 41802H, although a wide range of base addresses (e.g., without limitation, 30000H) may be employed. The first array (upper portion of Table 6) employs exemplary IEEE floating point objects at registers in the register space beginning at 1200H (through and including 122AH), and each object occupies two registers (i.e., 32 bits). The first array also employs fixed point objects at registers in the register space beginning at 1800H (through and including 182AH), and each object occupies two registers (i.e., 32 bits). In the second array (lower portion of Table 6), IEEE floating point objects are not employed (N/A) and each object occupies four registers (i.e., 64 bits) and begins at register 18A0H (through and including 18B8H).

The first four columns of Table 6 are for ease of illustration and are not part of the exemplary array 40. Each row is a record, which record consists of ten elements: (1) cmd/inst; (2) sub cmd; (3) # msgs; (4)–(7) Expand Buf #; (8) offset bytes; (9) frmt #; and (10) '2ndry cmd ndx', with each column being an element of the record. The tenth element ('2ndry cmd ndx') is the index into the secondary constant array 42, where the first (of perhaps several) additional commands are available for use in obtaining a particular record object from a particular INCOM slave device. This structure of the two arrays 40 (P) and 42 (S) is employed because an object is not necessarily retrieved with the identical command by every native language INCOM device.

The objects of the first (upper) array are assigned register numbers in monotonically increasing order (e.g., 1200H and 1800H, 1202H and 1802H, 1204H and 1804H), that provides a mechanism for calculating the index into these arrays. For example, the index, 3, to phase C current ($I_C$) is obtained from (1206H −1200H)/2=3. As another example, the index, 2, to the watt hour (WH) object of the second (lower) array is obtained from (18A8H−18A0H)/4=2.

TABLE 7

| Reg # | Object name | nbr | Cmd/ inst | sub cmd | # msgs | Expand Buf # | offset (bytes) | frmt # | ndx lnk |
|---|---|---|---|---|---|---|---|---|---|
| 1200 | status | 0 | 03 | 00 | 1 | | 0 | 48 | 29 |
| 1202 | $I_A$ | 1 | 03 | 50 | 4 | | 0 | 13 | -1 |
| 1204 | $I_B$ | 2 | 03 | 50 | 4 | | 3 | 13 | -1 |
| 1206 | $I_C$ | 3 | 03 | 50 | 4 | | 6 | 13 | -1 |
| 1208 | $I_X$ | 4 | 03 | 50 | 4 | | 9 | 13 | -1 |
| 120E | $V_{AB}$ | 5 | 03 | 60 | 3 | | 0 | 13 | -1 |
| 1210 | $V_{BC}$ | 6 | 03 | 60 | 3 | | 3 | 13 | -1 |
| 1212 | $V_{CA}$ | 7 | 03 | 60 | 3 | | 6 | 13 | -1 |
| | • | | | • | | | • | | • |
| | • | | | • | | | • | | • |
| 1228 | $3_{\phi realPwr}$ | 11 | 03 | 80 | 3 | | 0 | 13 | -1 |
| 1264 | pwr dmnd | 12 | 03 | 80 | 3 | | 3 | 13 | -1 |

TABLE 7-continued

| Object Reg # name | Cmd/ nbr | sub inst | # msgs | cmd | Expand Buf # | offset (bytes) | frmt # | ndx lnk |
|---|---|---|---|---|---|---|---|---|
| 18A8 WH | 13 | 03 | 80 | 3 | | 6 | 54 | 17 |
| 1232 freq | 14 | 03 | 90 | 3 | | 0 | 13 | −1 |
| 122A 3$_{\phi reacPwr}$ | 15 | 03 | 90 | 3 | | 3 | 13 | −1 |
| 1230 3$_{\phi ptApp}$ | 16 | 03 | 90 | 3 | | 6 | 13 | −1 |
| 18A8 WH | 17 | 03 | A0 | 1 | | 0 | 54 | 23 |
| • | | | • | | | • | | • |
| 18AC Id VAR | 21 | 03 | C0 | 4 | | 3 | 13 | −1 |
| 18B0 lag VAR | 22 | 03 | C0 | 4 | | 7 | 13 | −1 |
| 18A8 WH | 23 | 03 | F0 | 3 | 34 | 3 | 54 | −1 |
| 18A0 fwd WH | 24 | 03 | F0 | 6 | 35 | 3 | 54 | 26 |
| 18A4 rev WH | 25 | 03 | F0 | 6 | 35 | C | 54 | 27 |
| 18A0 fwd WH | 26 | 03 | F0 | 7 | 41 | 3 | 54 | 35 |
| 18A4 rev WH | 27 | 03 | F0 | 7 | 41 | 7 | 54 | 36 |
| • | | | • | | | • | | • |
| 18A0 fwd WH | 35 | 03 | B0 | 5 | | 3 | 54 | −1 |
| 18A4 rev WH | 36 | 03 | B0 | 5 | | 7 | 54 | −1 |

Table 7, above, shows a portion of a typical secondary constant array 42 of commands for the INCOM native language. Table 7, like Table 6, assumes an exemplary base address of 40000H, although a wide range of base addresses may be employed. The first three columns of Table 7 are for ease of illustration and are not part of the exemplary array 42. Each row is a record, which record consists of ten elements: (1) cmd/inst; (2) sub cmd; (3) # msgs; (4)–(7) Expand Buf #; (8) offset bytes; (9) frmt #; and (10) ndx lnk, with each column being an element of the record. In this array 42, unlike array 40 of Table 6, objects are not in monotonically increasing order.

Entry into this secondary array 42 is initially via the '2ndry cmd ndx' of the primary constant array 40 of Table 6. Once entered, progression through this array 42 is determined by the 'ndx lnk' record element. Calculation of an index to a record in this array 42 is not required.

Figure 5:
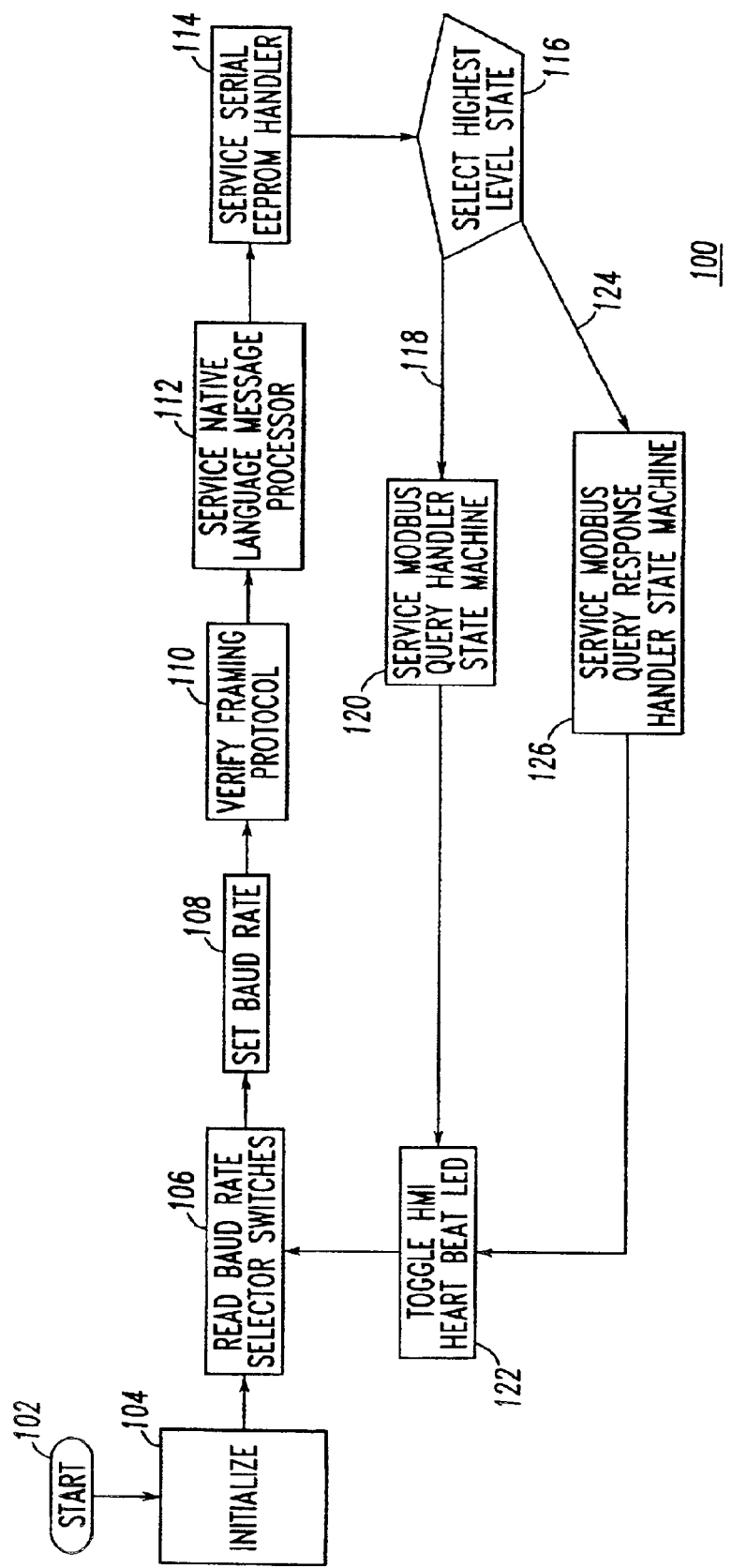
FIG. 5 is a flowchart of the main loop of the processor of the Modbus Master INCOM Network Translator Module of FIG. 4.

FIG. 5 shows the main loop 100 of the μP 80 of the mMINT module 20 of FIG. 4. FIG. 5 also shows the 'MainState' machine of this module. The main loop 100 is the highest level state machine of the mMINT module 20. This state machine has two states: (1) handle query; and (2) respond to query. After starting, at 102, on power up, the μP 80 initializes the micro-controller 72, at 104. The step 104 includes initialization of: (1) μP 80 I/O ports 90,88; (2) the Modbus network system including UART 82; (3) the INCOM network system including INCOM port 84; (4) other serial communications (not shown); (5) serial EEPROM 115, which is part of MEM 86; (6) a μP timer interrupt (not shown); (7) system status bits (not shown); (8) system variables (not shown); (9) diagnostic counters (not shown); and (10) the query handler 130 of FIGS. 6A–6C. Next, at 106, the baud rate selector switches SW2 96 are read, and the Modbus baud rate is set, at 108, in the UART 82.

At 110, the framing protocol of any received Modbus message is suitably verified. Next, at 112, the INCOM language message processor 200 (FIG. 6D) is serviced. The message processor 200 translates INCOM data formats to Modbus data formats. It also creates an array of data bytes for the query response handler to send to the master 4. If there is no work for the message processor, then it simply returns to the main state or loop 100. Then, at 114, the handler for the serial EEPROM 115 of FIG. 4 is serviced. The serial EEPROM 115 is advantageously employed for non-volatile storage of various values. If there is no service to perform, then the EEPROM handler simply returns to the main state or loop 100.

Figure 6A:
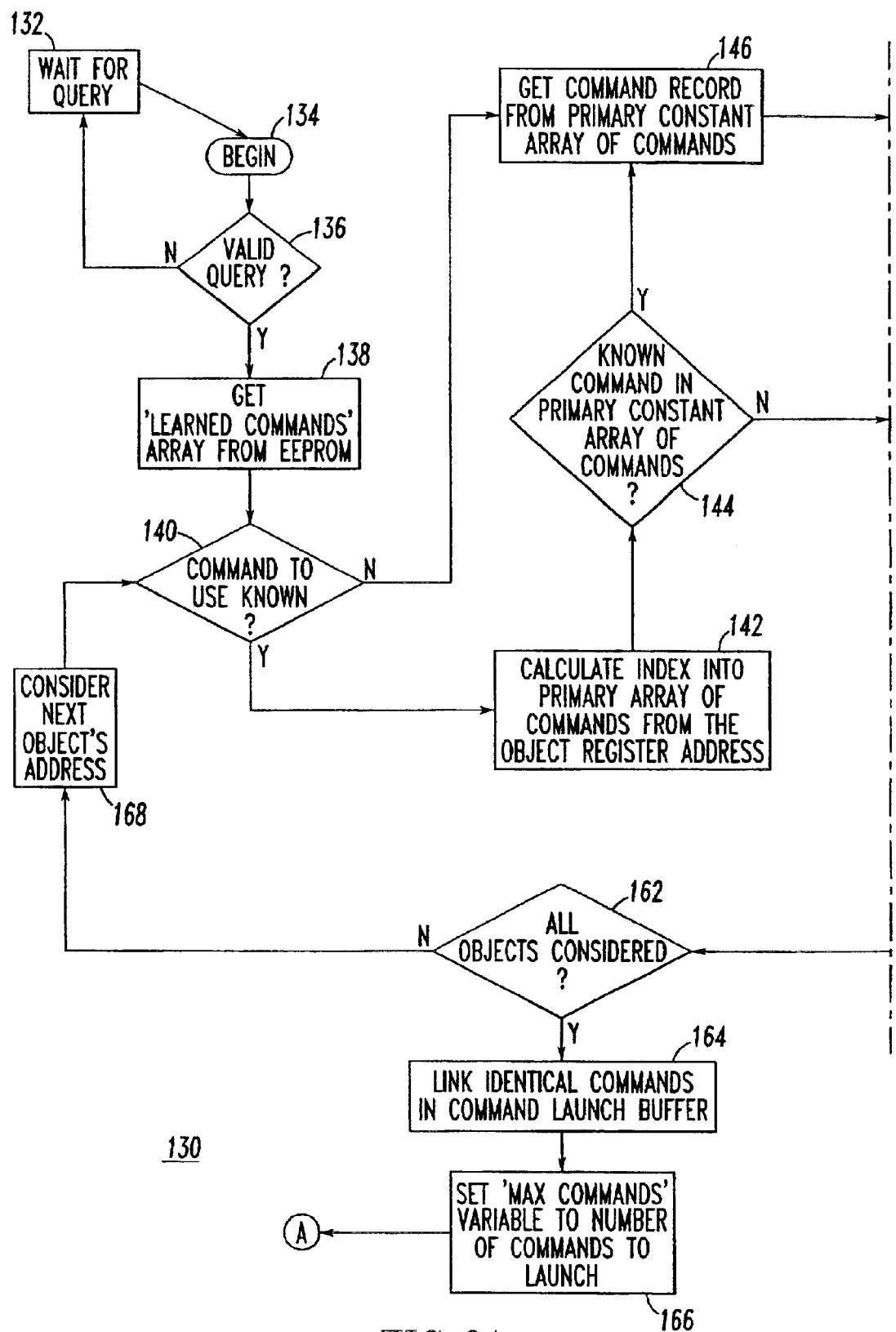
Figure 6B:
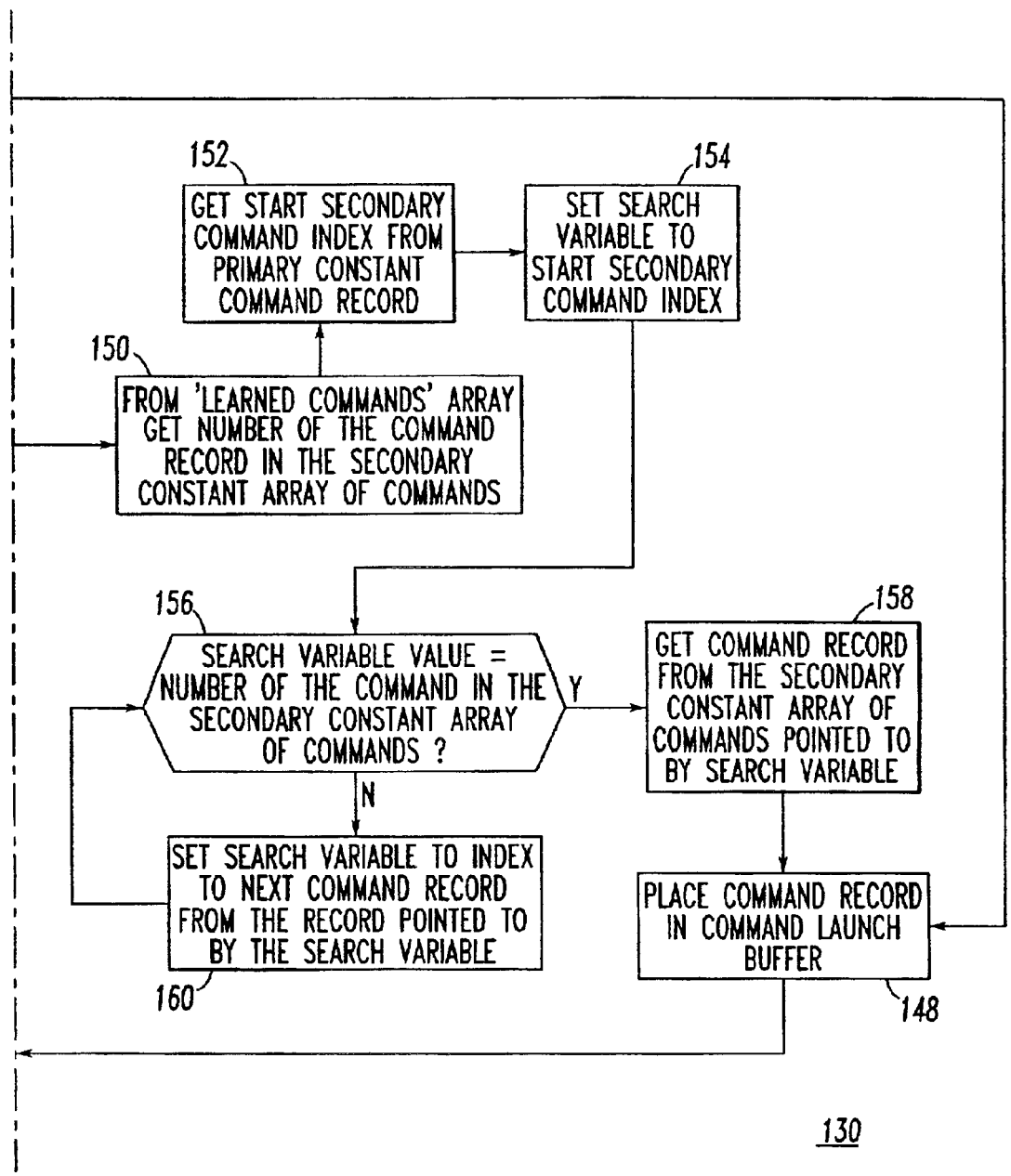
Figure 6C:
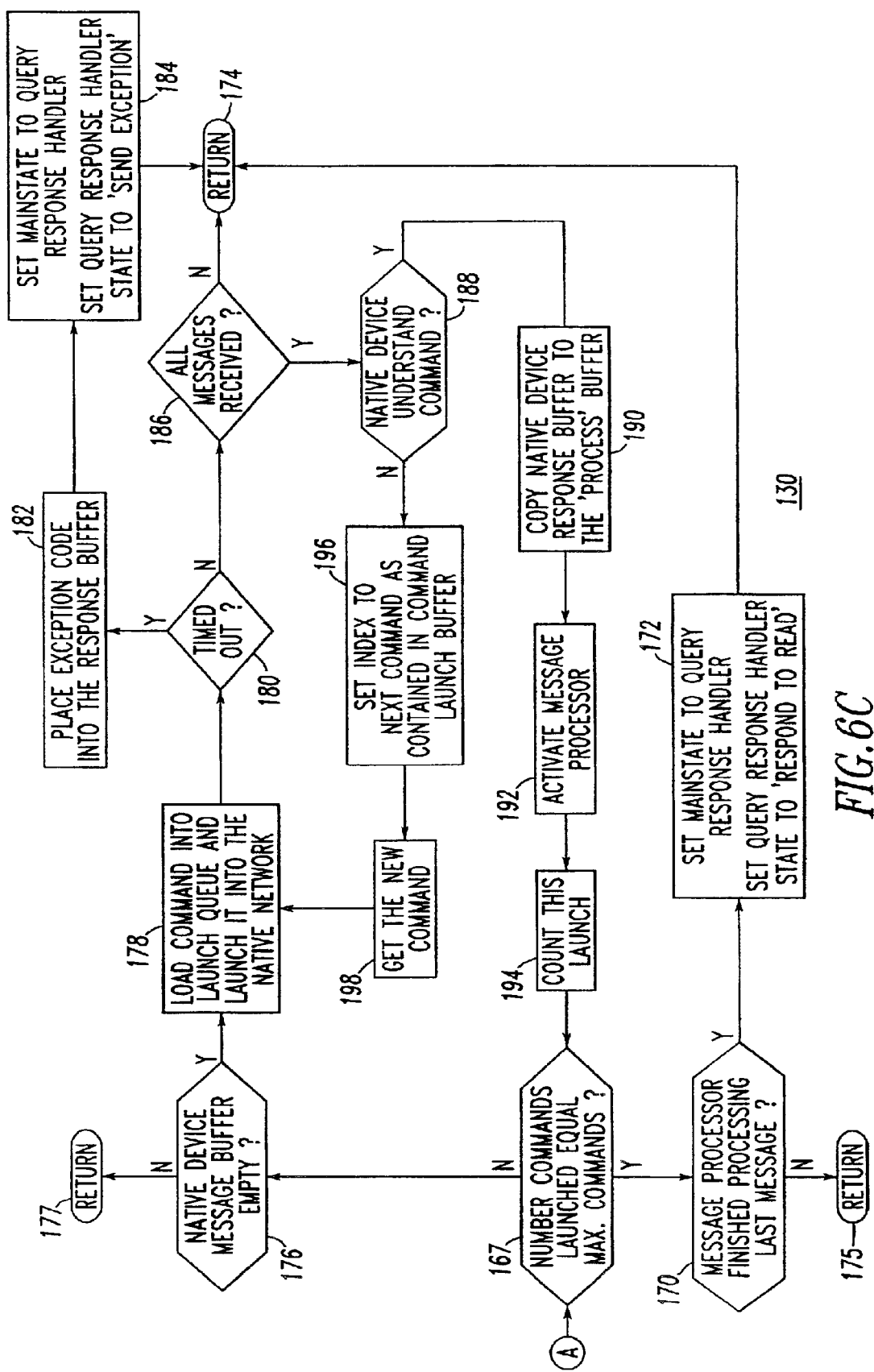
Figure 7:
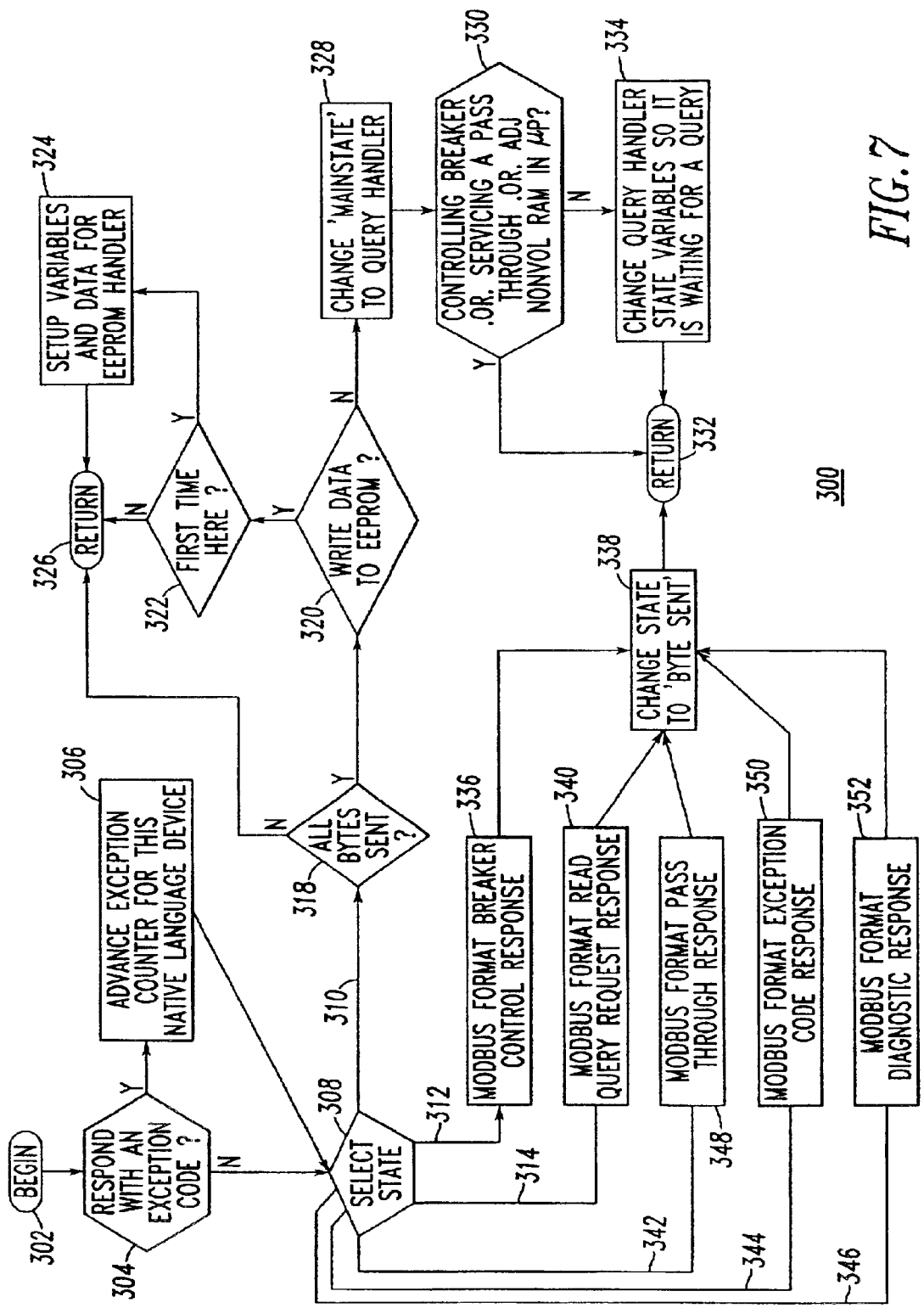

At 116, one of the two main states is selected. One possible state is associated with the Modbus query response handler 300 of FIG. 7, while a second possible state is associated with the Modbus query handler 130 of FIGS. 6A–6C. Path 118 is selected for handling a Modbus query (FIGS. 6A–6C), while path 124 is selected for handling a Modbus query response (FIG. 7). If path 118 is taken, then, at 120, the Modbus query handler state machine is serviced. Exit of this state associates a 'MainState' variable with the query response handler 300 (FIG. 7). Then, at 122, it is determined if it is time (e.g., once per second) to toggle the human machine interface heart beat LED 70 of FIG. 2. After step 122, step 106 is repeated.

On the other hand, if path 124 is taken from step 116, then, at 126, the Modbus query response handler state machine is serviced. Exit of this state associates the 'MainState' variable with the query handler 130 (FIGS. 6A–6C). After step 126, step 122 is executed, as discussed above.

FIGS. 6A–6C show the query handler 130 of the μP 80 of the mMINT module 20 of FIG. 4. First, the handler 130 waits for a query from the Modbus master 14 of FIG. 2, at 132. If a query is received, then the handler begins at 134. Next, at 136, it is determined if the query is valid as discussed below in connection with Tables 8–10. If there is an invalid query, then execution resumes at 132. Otherwise, at 138, a 'learned commands' array is obtained from EEPROM 115 of FIG. 4. The 'learned commands' array permits optimal interfacing with the slave INCOM devices as discussed above in connection with Tables 6 and 7. If the INCOM command to use has been learned at 140, then an index into the primary constant array of commands 40 is calculated from the Modbus object register address. If the known command is in the array of commands 40 (i.e., '2ndry cmd ndx' of Table 6 is equal to −1), at 144, then the command record is obtained from the primary constant array of commands 40 at 146. Next, at 148, the INCOM command record is placed in an INCOM command launch buffer (not shown).

Otherwise, if the known command is not in the primary constant array of commands 40 at 144, then the number of the command record in the secondary constant array of commands 42 is obtained, at 150, from the 'learned commands' array. Next, at 152, the secondary command index is obtained from the primary constant command record (i.e., from '2ndry cmd ndx' of Table 6). Then, at 154, a search variable is set to the starting secondary command index from step 152. At 156, it is determined if the search variable value of step 154 is equal to the number (e.g., as shown by the 'nbr' value in Table 7) of the command in the secondary constant array of commands 42. If so, at 158, then the INCOM command record is obtained from the secondary constant array of commands 42 as pointed to by the search variable value. Next, at 148, the INCOM command record is placed in an INCOM command launch buffer (not shown). On the other hand, if the search variable value of step 154 is not equal to the number of the command in the secondary constant array of commands 42, then, at 160, the search variable is set (e.g., by the 'ndx lnk' value) to index to the next command record from the record pointed to by the search variable.

After step 148, it is determined, at 162, if all objects in the Modbus request have been considered. For example, there may be multiple objects requested by the Modbus master 14 of FIG. 2 that can be obtained from an INCOM device by a single INCOM command. The commands for such objects, in the command launch buffer, are identical. When these commands are linked, the offset to each object in the INCOM device response buffer can be obtained from the value of the associated element (i.e., "offset (bytes)") in the command record. For example, if the Modbus request pertains to only one object (e.g., phase A current, IA), then step 164 is executed. Otherwise, if the Modbus request pertains to more than one object (e.g., phase A current, IA; phase B voltage, VB), then step 168 is executed to consider the next object's address. Then, step 140 is repeated.

On the other hand, if all objects were considered at 162, then the identical commands in command launch buffer are linked at 164. Finally, a variable 'maxCmd' is set to the number of INCOM commands to launch, at 166, before execution resumes at 167 of FIG. 6C.

Referring to FIG. 6C, at 167, it is determined if the number of INCOM commands launched is equal to the 'maxCmd' variable from step 166 of FIG. 6A. If so, then at 170, it is determined if the message processor 200 (FIG. 6D) is finished processing the last message. The message processor 200 includes a state machine that formats (e.g., floating point format, fixed point format) the INCOM language object to the Modbus object format. The state employed is a function of record element 'frmt #' of the primary or secondary constant arrays of commands 40,42. If the message processor 200 is finished at 170, then the variable 'MainState' is set to the query response handler, and the query response handler state is set to 'respond to read' at 172. Otherwise, the routine 130 returns at 175.

On the other hand, if the number of INCOM commands launched is not equal to the 'maxCmd' variable, at 167, then it is determined if the INCOM device message buffer is empty at 176. If it is not empty, then the routine 130 returns at 177. Otherwise, the INCOM command is loaded into the launch queue and is launched onto the INCOM network 24 at 178. If the INCOM port is timed out (e.g., no response is timely received from the INCOM slave device) at 180, then, at 182, a suitable exception code is placed into the Modbus response buffer at 182. Next, at 184, the variable 'MainState' is set to the query response handler 130, and the query response handler state is set to 'send exception'. Then, the routine 130 returns at 174.

On the other hand, if there was no timeout at 180, then it is determined from the '#msgs' element of the INCOM command record (Table 6) if all INCOM messages were received at 186. If so, then it is determined if the INCOM device understands (i.e., if no NACK was returned and the INCOM device responded with the data) the command at 188. If yes, then the INCOM device response buffer is copied to a 'process' buffer at 190. Next, the message processor 200 is activated at 192. Then, the number of INCOM commands launched is incremented at 194, after which step 167 is repeated to determine if the number of commands launched is equal to the variable 'maxCmd'.

Otherwise, if the INCOM device does not understand the command at 188, then the index is set to the next INCOM command as contained in the command launch buffer (as discussed at 148 of FIG. 6B) at 196. Then, the next INCOM command is obtained at 198 after which step 178 is executed to load the INCOM command into the launch queue and launch it onto the INCOM network.

Referring to FIG. 6D, the message processor 200 of the mMINT module 20 is shown. The message processor 200 begins, at 202, after which it is determined whether the message processor 200 was activated, at 204. The message processor 200 is de-activated at 226 and is activated at 192 of FIG. 6C. Next, at 206, one of two states 208,210 are selected. The establish state 208 is selected at 192 of FIG. 6C and the convert state is established at 214.

If the establish state 208 is selected, then, the linked information is established as obtained from the launch buffer at 212. This information includes the offset into the receiver buffer, the offset into the Modbus response buffer, and the format. Then, the message processor state is changed to convert at 214. Finally, the message processor 200 returns at 216.

On the other hand, if the convert state 210 is selected, at 206, then it is determined if processing of all linked messages is finished, at 218. This processing is finished when the index to the linked object is equal to −1. If not finished, then, at 220, three variables are initialized, including: (1) variable 'z' is set to the index to the linked object in the launch queue; (2) variable 'm' is set to the offset to the message in the INCOM response buffer; and (3) variable 'zP' is set to the offset into the Modbus response buffer. Next, at 224, the function 230 is executed in order to determine the variable 'inoc' as a function of convertFormat(z,m,zP). The variable 'inoc' is the index to the next object to convert. The message processor 200 returns at 216.

Otherwise, if processing of all linked messages is finished, at 218, then the message processor is de-activated and the 'receive msg processor buffer empty' flag is set at 226. Then, the message processor 200 returns at 228.

The convertFormat function 230 begins, at 232, by determining whether there is a convert status object. This is a test of whether the query requested the object at register 41200 (status). Next, at 234, the variable 'status' is obtained. This variable includes three bytes designated as 'cause', 'primary cause' and 'secondary cause'. Then, at 236, the variable 'status' is placed in the Modbus response buffer based upon the offset variable 'zP'. Next, at 238, the variable 'inoc' is determined. This is an additional part of the linked information from 212 of FIG. 6D. The variable is the index into that linked information. The index is initialized at 212. Finally, the variable 'inoc' is returned at 240.

On the other hand, if there was no convert status object, at 232, then the format from the linked object is obtained based upon the index variable 'z' at 242. Next, at 244, the format state (e.g., state #13 or #54) is selected. This format state is part of the linked information from 212 of FIG. 6D. If the format state is #54, at 248, then an energy object is converted to a 64 bit variable at 250 before being placed in the Modbus response buffer at 236. Otherwise, if the format state is #13, at 246, then it is determined if there is a valid 24-bit floating point object at 252. The INCOM 24-bit floating point format provides a specific bit that, when set, specifies a valid 24-bit floating point number. The INCOM product sets this bit. If valid, then it is determined whether to convert the object to an IEEE floating point variable at 254. If the related query register is 412xx (wherein xx is a don't care term), then it is to be an IEEE floating point conversion. Otherwise, if the related query register is 418xx, then it is to be a fixed point conversion. If so, then the object is converted to an IEEE floating variable at 256 before being placed in the Modbus response buffer at 236. Otherwise, the object is converted to a fixed-point variable at 258 before 236 is executed.

On the other hand, if there is no valid 24-bit object at 252, then the 'MainState' variable is set to the response handler at 260. Finally, the 'response handler' state is set to 'send' exception code '2' at 262 before the message processor 200 returns at 216.

FIG. 7 shows the query response handler 300 of the μP 80 of the mMINT module 20 of FIG. 4. The handler 300 functions to send various buffers to the Modbus master 14 of FIG. 2. The handler 300 begins, at 302, after which it is determined whether to respond with an exception code, at 304. As discussed in connection with 182 of FIG. 6C, an exception code is issued as a response from an error handler situation. If a response is needed, then, at 306, the exception counter is advanced for the INCOM language device. Otherwise, and after 306, the proper one of the states 310,312,314,342,344,346 is selected at 308. The query handler sets the state of the query response handler state machine at 172 and 184 of FIG. 6C. If the byte sent state 310 is selected, then it is determined at 318 if all bytes have been sent (e.g., the number of bytes in the Modbus response buffer is established by counting bytes in the buffer). If so, then it is determined from variable 'write data to EEPROM' being true, if data is to be written to EEPROM 115 at 320. At 196 of FIG. 6C, the code related to which command was used is selected. That code is written to EEPROM in the learned commands array. Also, the bit 'write data to EEPROM' is set at 196. If the test at 320 is met, then it is determined if this is the first execution of step 322 since the response handler state was first entered to send the contents of the present response buffer to the Modbus master 14. If so, then the variables and data are suitably set up for the EEPROM handler at 324. When the EEPROM handler is finished, it changes variables such that 'write data to EEPROM' is false, after which the handler 300 returns at 326. Otherwise, after 322, the routine returns at 326.

On the other hand, if 'write data to EEPROM' is false at 320, then the variable 'MainState' is set to the query handler at 328. Next, at 330, if the mMINT module 20 is controlling a circuit breaker via the query handler, or if it is servicing a pass through response, or if it is adjusting non-volatile RAM of the μP 80, then the handler returns at 332. Otherwise, at 334, the query handler state variables are changed in order that it is waiting for a query, after which it returns at 332.

If the state 312 for a Modbus format breaker control response was selected at 308, then that response is prepared at 336, and the state is changed to 'byte sent' at 338, after which the handler 300 returns at 332. Similarly, if the state 314 for a Modbus format read query request response was selected at 308, then that response is prepared at 340, and the state is changed to 'byte sent' at 338, after which the handler 300 returns at 332.

If the state 342 for a Modbus format pass through response was selected at 308, then that response is prepared at 348, and the state is changed to 'byte sent' at 338, after which the handler 300 returns at 332. Similarly, if the state 344 for a Modbus format exception code response was selected at 308, then that response is prepared at 350, and the state is changed to 'byte sent' at 338, after which the handler 300 returns at 332. In a like manner, if the state 346 for a Modbus format diagnostic response was selected at 308, then that response is prepared at 352, and the state is changed to 'byte sent' at 338.

The main loop 100 of FIG. 5, the query handler 130 of FIGS. 6A–6C, the message processor 200 of FIG. 6D, and the query response handler 300 of FIG. 7 form a communication routine 354 for the μP 80 of FIG. 4. The communication routine 354 receives a request based upon the register map 44 of FIG. 2 through the Modbus transceiver 74 related to one or more of the values of one of the slave INCOM devices 26,28,30,32,34. The routine 354 sends a request based upon the slave's object/command map through the INCOM transceiver 76 related to the one or more INCOM device values. The routine 354 receives a response based upon the slave's object/command map through the INCOM transceiver 76 related to the one or more INCOM device values. In turn, the routine 354 sends a response based upon the register map 44 through the Modbus transceiver 74 related to one or more INCOM device values.

The exemplary mMINT module 20 of FIG. 2 responds to particular Modbus function codes including function codes 03H, 04H, 08H and 10H. A block of registers (e.g., from the Register column(s) of Table 12) can be established for each INCOM slave device attached to the mMINT module 20. In the exemplary embodiment, the block size is 100 registers.

Function code 10H is employed to load a block of registers. The block is stored at the beginning register 45000. This register does not contain an object. Rather, the Modbus master 14 writes data to this register, with the data being Modbus registers (e.g., 41202, 41204, 41206) of Table 12. Only the first object register is loaded with the block of registers. For example, if phase A current, IA, occupies registers 41202 and 41203, then only register 41202 is loaded with the block of registers.

The read function code (e.g., 03H or 04H) and a register 45100 are employed to obtain the contents of the objects in the block of registers. The number of points (i.e., registers) in the read query is typically twice the number of objects because each object may normally occupy two registers in the exemplary embodiment. However, energy objects occupy four registers and some objects occupy one register. The communication routine 354 is adapted to read a value from one of the INCOM devices, and to send the read value in the response based upon the register map 44 of FIG. 2 through the Modbus transceiver 74 of FIG. 4.

A feature of the mMINT module 20 is its capability to pass INCOM commands/data directly through to any (e.g., 32) attached INCOM slave devices. As discussed above, the INCOM network 24 of FIG. 2 includes a plurality of commands operatively associated with the slave devices 26,28,30,32,34. The communication routine 354 is adapted to receive a request through the Modbus transceiver 74 based upon one of the commands Thus, under the IMPACC Communications Protocol, every INCOM slave device (i.e., INCOM product) object and capability is available to the Modbus master 14 of FIG. 2. When passing a command or data through to an INCOM slave, the mMINT module 20 acts as a dumb Modbus slave. Without modification, it passes the command or data through to the INCOM slave device on the INCOM network 24. In the event the INCOM slave device responds, the mMINT module 20 saves the response until the Modbus master 14 queries for that response. The mMINT module 20 makes no modification to or interpretation of the INCOM product response data. The Modbus master 14 writes (beginning at register 46000) the INCOM product command/data using function code 10H. The protocol for passing a command through to an INCOM product is shown in Table 8.

TABLE 8

| Byte # | Name | Contents |
| --- | --- | --- |
| 0 | address | INCOM device address |
| 1 | fct code | function code 10H |
| 2 | strt addr hi | high byte of starting address = 60H |
| 3 | strt addr lo | low byte of starting address = 00H |
| 4 | nbr regs hi | high byte of register count = 0 |
| 5 | nbr regs lo | low byte of register count = 3 |
| 6 | byte count | 4 |
| 7 | data | bit 7 is 1, bits 6–0 are the number of bytes from the INCOM device |
| 8 | data | BYTE0 of command |
| 9 | data | BYTE1 of command |
| 10 | data | BYTE2 of command |
| 11 | CRC lo | low CRC byte |
| 12 | CRC hi | high CRC byte |

The protocol for passing data through to an INCOM product is shown in Table 9.

TABLE 9

| Byte # | Name | Contents |
| --- | --- | --- |
| 0 | address | INCOM device address |
| 1 | fct code | function code 10H |
| 2 | strt addr hi | high byte of starting address = 60H |
| 3 | strt addr lo | low byte of starting address = 00H |
| 4 | nbr regs hi | high byte of register count = 0 |
| 5 | nbr regs lo | low byte of register count = 3 |
| 6 | byte cnt | byte count = 4 |
| 7 | data | bit 7 is 0, bits 6–0 are the number of messages from the INCOM device |
| 8 | data | BYTE0 of data message |
| 9 | data | BYTE1 of data message |
| 10 | data | BYTE2 of data message |
| 11 | CRC lo | low CRC byte |
| 12 | CRC hi | high CRC byte |

The Modbus master reads the INCOM product response to a pass through query beginning at register 46100 using either function code 03H or 04H.

The format of the read query response is shown in Table 10.

TABLE 10

| Byte # | Name | Contents |
| --- | --- | --- |
| 0 | address | INCOM device address |
| 1 | fct code | function codes 03H or 04H |
| 2 | byte count | 4 * number of messages from INCOM device |
| 3 | data hi | BYTE0 of response message 0 (i.e., the first message) |
| 4 | data lo | BYTE1 of response message 0 |
| 5 | data hi | BYTE2 of response message 0 |
| 6 | data lo | status of response message 0 |
| ... | ... | ... |
| n − 3 | data hi | BYTE0 of last (nn$^{th}$) INCOM device response message |
| n − 2 | data lo | BYTE1 of last response message from INCOM device |
| n − 1 | data hi | BYTE2 of last response message from INCOM device |
| n | data lo | status of last response message from INCOM device |
| n + 1 | CRC lo | low CRC byte |
| n + 2 | CRC hi | high CRC byte |

If the data of the response message has no errors, then the "status of response message" value is zero. On the other hand, if the mMINT module 20 received the response message with an over run error, a BCH error or a time out, then the value of the "status of response message" value is equal to one, two or four, respectively.

The Modbus master 14 writes to register 46200 the slave action number (3 bytes). The master then writes the complement of the slave action number to the next three bytes. This is done in a single write query. In this manner, the slave action number is equal to BYTE2, BYTE1, BYTE0. The master then writes using function code 10H the following bytes: 0—slave address; 1—function code 10H; 2—start address hi=62H; 3—start address lo=00H; 4—number of registers hi=0; 5—number of registers lo=3; 6—byte count= 6; 7—BYTE2 of slave action number; 8—BYTE1 of slave action number; 9—BYTE2 complement; 10—BYTE0 of slave action number; 11—BYTE0 complement; 12—BYTE1 complement; 13—CRC lo; and 14—CRC hi.

The mMINT module 20 supports various diagnostic sub-functions. The Modbus master 14 may obtain diagnostics from the mMINT module 20 or an attached INCOM product using function code 08H. Table 11 shows the diagnostic sub-function numbers. In order to employ the mMINT address 248 in the diagnostic query, the third switch of SW2 92 is opened as discussed above in connection with FIG. 4.

TABLE 11

| Sub-Function No. (decimal) | Name | Address for the Query |
| --- | --- | --- |
| 0 | echo query | mMINT address 248 |
| 1 | restart communications | INCOM device address |
| 4 | force listen | INCOM device address |
| 10 | clear counters | mMINT address 248 |
| 11 | bus message count | mMINT address 248 |
| 12 | communication error count | mMINT address 248 |
| 13 | exception error count | INCOM device address |
| 14 | slave message count | INCOM device address |
| 15 | slave no response count | INCOM device address |
| 16 | slave NAK count | INCOM device address |
| 17 | slave busy count | INCOM device address |
| 18 | UART over run error count | mMINT address 248 |
| 20 | clear UART over run error count | mMINT address 248 |
| 22 | INCOM BCH error count | INCOM device address |
| 23 | INCOM over run count | INCOM device address |
| 24 | UART framing error count | mMINT address 248 |
| 25 | UART noise error count | mMINT address 248 |
| 26 | UART over run error count | mMINT address 248 |

Under certain circumstances, the mMINT module 20 will return an exception code in the response. Those exemplary codes include: (1) 01H if the function in the query is not supported by the mMINT module; (2) 02H if the data (object) register is illegal; (3) 03H if the data value in the query is illegal; (4) 04H if the slave INCOM product fails (e.g. a time out); (5) 05H (ACK) is returned under suitable circumstances; (6) 07H (NACK) if the mMINT module cannot perform the requested function; and (7) 84H if only a partial register is used in the query.

The Modbus register map 44 for INCOM products is shown in Table 12, which includes an exemplary listing of INCOM products for interface by the mMINT module 20.

As a result of the pass through feature of the mMINT module 20, all INCOM product objects are accessible by the Modbus master 14.

TABLE 12

| Objects - (complete list) | | | Register | | | INCOM Products - (partial list) | | | | | | | | |
|---|---|---|---|---|---|---|---|---|---|---|---|---|---|---|
| Name | numeric | Units | IEEE float | Fixed point (FP) | FP scale factor | IQ-200 | DP-4000 | IQ Analyze | IQ Data | IQ Data Plus | Digitrip 810 | Digitrip 910 | Digitrip 1150 | IQTransfer II |
| prod ID | prod ID | | | 4127A or 4187A | | | | | | | | | x | x |
| status cause | primary | | | 41200 or 41800 hi byte | | | | | | | | | x | x |
| | secondary | | | 41200 or 41800 lo byte | | | | | | | x | x | | |
| | cause | | | 41201 or 41801 hi byte | | | | | | | | | x | x |
| current | $I_A$ | A | 41202 | 41802 | 10 | x | x | x | x | x | x | x | x | |
| | $I_B$ | A | 41204 | 41804 | 10 | x | x | x | x | x | x | x | x | |
| | $I_C$ | A | 41206 | 41806 | 10 | x | x | x | x | x | x | x | x | |
| | $I_G$ | A | 41208 | 41808 | 10 | x | x | x | x | x | x | x | | |
| | $I_N$ | A | 4120A | 4180A | 10 | x | x | x | | | x | | | |
| | $I_{Avg}$ | A avg | 4120C | 4180C | 10 | | x | x | | | | | | |
| | Peak $I_A$ demand | A | 41220 | 41820 | 10 | | x | | | | | | | |
| | peak $I_B$ demand | A | 41222 | 41822 | 10 | | x | | | | | | | |
| | peak $I_C$ demand | A | 41224 | 41824 | 10 | | x | | | | | | | |
| | peak $I_x$ demand | A | 41226 | 41826 | 10 | | x | | | | | | | |
| L-L voltage | $V_{AB}$ | V | 4120E | 4180E | 10 | x | x | x | x | x | | x | x | |
| | $V_{BC}$ | V | 41210 | 41810 | 10 | x | x | x | x | x | | x | x | |
| | $V_{CA}$ | V | 41212 | 41812 | 10 | x | x | x | x | x | | x | x | |
| | $V_{LLavg}$ | Vavg | 41214 | 41814 | 10 | | x | x | | | | | | |
| L-N voltage | $V_{AN}$ | V | 41216 | 41816 | 10 | x | x | x | x | | | | | |
| | $V_{BN}$ | V | 41218 | 41818 | 10 | x | x | x | x | | | | | |
| | $V_{CN}$ | V | 4121A | 4181A | 10 | x | x | x | x | | | | | |
| | $V_{LN}$ | Vavg | 4121C | 4161C | 10 | x | | x | | | | | | |
| N-G voltage | $V_{NG}$ | V | 4121E | 4181E | 10 | | | x | | | | | | |
| power | power | W | 41276 | 41876 | 1 | x | x | x | | | | | | |
| | demand | W | 41264 | 41864 | 1 | x | x | x | | | | x | x | |
| | real 3 ph | W | 41228 | 41828 | 1 | x | x | x | x | x | x | x | x | |
| | reactive 3 ph | VAR | 4122A | 4182A | 1 | x | x | x | x | x | | x | x | |
| | apparent 3 ph | VA | 4122E | 4182E | 1 | x | x | x | x | x | | x | x | |
| | A ph | W | 41238 | 41838 | 1 | x | | x | | | | | | |
| | B ph | W | 4123A | 4183A | 1 | x | | x | | | | | | |
| | C ph | W | 4123C | 4183C | 1 | x | | x | | | | | | |
| | reactive A ph | VAR | 4123E | 4183E | 1 | x | | x | | | | | | |
| | reactive B ph | VAR | 41240 | 41840 | 1 | x | | x | | | | | | |
| | reactive C ph | VAR | 41242 | 41842 | 1 | x | | x | | | | | | |
| | apparent A ph | VA | 41244 | 41844 | 1 | x | | x | | | | | | |
| | apparent B ph | VA | 41246 | 41846 | 1 | x | | x | | | | | | |
| | apparent C ph | VA | 41248 | 41848 | 1 | x | | x | | | | | | |

TABLE 12-continued

| Objects - (complete list) | | Units | Register IEEE float | Register Fixed point (FP) | FP scale factor | INCOM Products - (partial list) | | | | | | | | |
|---|---|---|---|---|---|---|---|---|---|---|---|---|---|---|
| Name | numeric | | | | | IQ-200 | DP-4000 | IQ Analyze | IQ Data | IQ Data Plus | Digitrip 810 | Digitrip 910 | Digitrip 1150 | IQTransfer II |
| power factor | pf | pf | 41278 | 41878 | 10 | x | | x | | | x | x | x | x |
| | displacement 3 ph | pf | 4122C | 4182C | 100 | | | | | | | | | |
| | displacement A ph | pf | 4124A | 4184A | 100 | x | | x | | | | | | |
| | displacement B ph | pf | 4124C | 4184C | 100 | x | | x | | | | | | |
| | displacement C ph | pf | 4124E | 4184E | 100 | x | | x | | | | | | |
| | apparent A ph | pf | 41250 | 41850 | 100 | x | | x | | | | | | |
| | apparent B ph | pf | 41252 | 41852 | 100 | x | | x | | | | | | |
| | apparent C ph | pf | 41254 | 41854 | 100 | x | | x | | | | | | |
| | apparent | pf | 41230 | 41830 | 100 | x | | x | | | | | | |
| energy | forward | Wh | 412A0 | 418A0 | 10 | x | x | x | | | | | x | x |
| | reverse | Wh | 412A4 | 418A4 | 10 | x | x | x | | | | | x | x |
| | net | Wh | 412A8 | 418A8 | 10 | | | x | | | | | x | x |
| | apparent | VAh | 412AC | 418AC | 1 | x | x | x | | | | | x | x |
| reactive energy | lead | VARh | 412B4 | 418B4 | 1 | x | x | x | | | | | x | x |
| | lag | VARh | 412B0 | 418B0 | 1 | x | x | x | | | | | x | x |
| | net | VARh | 412B8 | 418B8 | 1 | | | x | | | | | x | x |
| frequency source 1 | freq | Hz | 41232 | 41832 | 10 | x | x | x | | | | | x | x |
| | $V_{AB}$ | V | 41266 | 41866 | 10 | | | | | | | | | |
| | $V_{BC}$ | V | 41268 | 41868 | 10 | | | | | | | | | |
| | $V_{CA}$ | V | 4126A | 4186A | 10 | | | | | x | | | | |
| source 2 | freq | Hz | 4126E | 4186E | 10 | | | | | | | | | |
| | $V_{AB}$ | V | 41270 | 41870 | 10 | | | | | | | | | |
| | $V_{BC}$ | V | 41272 | 41872 | 10 | | | | | | | | | |
| | $V_{CA}$ | V | 41274 | 41874 | 10 | | | | | | | | | |
| K-factor | K-factor | Hz | 41234 | 41834 | 1 | | x | | | | | | x | x |
| THD factor | THD factor | | 41236 | 41836 | 1 | | x | | | | | | x | x |

Figure 8:
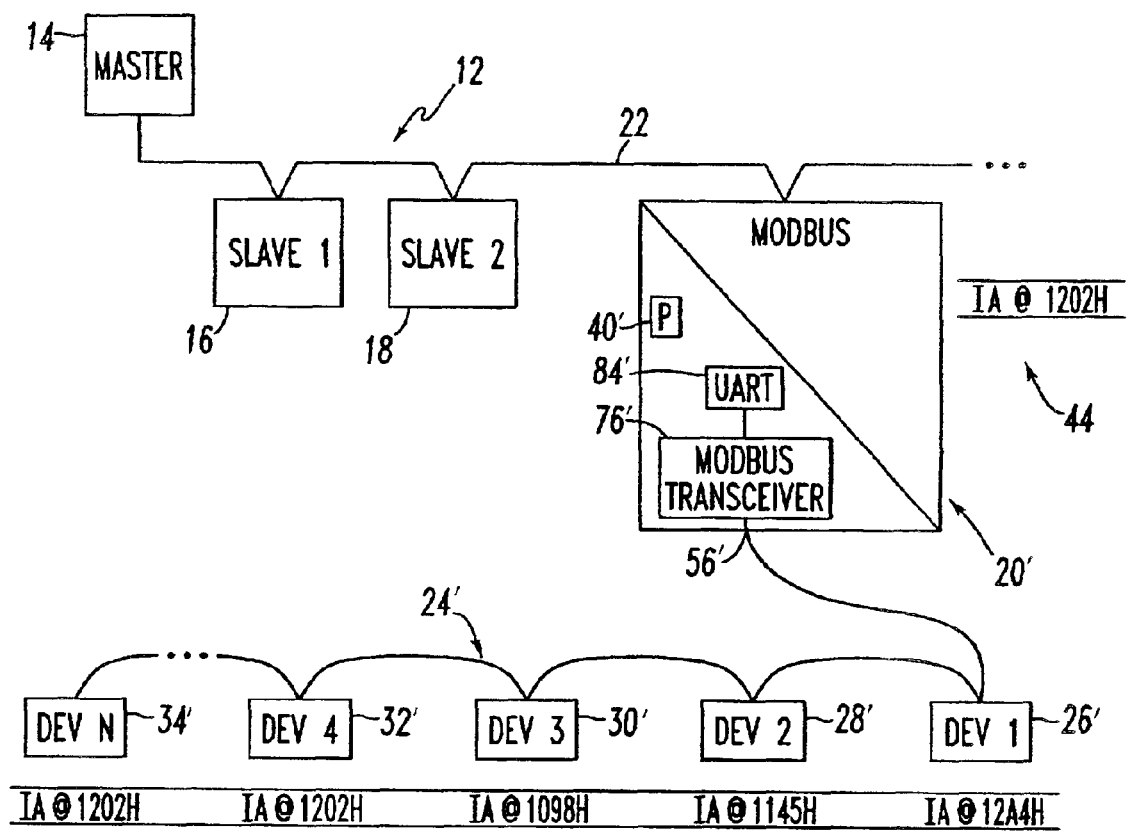
FIG. 8 is a block diagram in schematic form of a Modbus Master Modbus Network Translator Module in accordance with another embodiment of the present invention.

FIG. 8 shows a mMMNT (modbus Master Modbus Network Translator) module 20' in accordance with another embodiment of the present invention. This mMMNT module 20' is similar to the mMINT module 20 of FIGS. 2 and 4, except that the slave INCOM network 24 is replaced by a slave Modbus network 24'. The module 20' advantageously maps identical Modbus objects located in different Modbus registers (in the lower level Modbus network 24') to a particular Modbus register in the upper level Modbus network 12. The module 20' includes a UART 84' for interfacing a second Modbus transceiver 76' for communication through the second Modbus connector 56'. The module 20' includes a primary constant array (P) 40' of commands, which is a constant array of records of native language Modbus elements employed to obtain a specific object from a slave device, which speaks the native Modbus language. In this example, the module 20' does not employ a secondary constant array (S) of commands.

In this manner, there are associated cost advantages, including, for example: (1) reduced documentation cost; (2) no reprogramming of the Modbus master 14 when another slave device, such as 34', is attached thereto; and (3) the capability of attaching many more slave devices, such as 16,18, to the upper level Modbus network 12 because of the reduced electrical load on that network (i.e., because the slave devices 26',28',30',32',34' are attached to the lower level Modbus network 24'). Furthermore, in accordance with the present invention, for the Modbus master 14, the current IA, for example, from any of the slave devices 26',28',30', 32',34' is always in register 1202H. However, on the lower level Modbus network 24', the current IA for the slave device 26' is in Modbus Register 12A4H; the current IA for the slave device 28' is in Modbus Register 1145H; the current IA for the slave device 30' is in Modbus Register 1098H; and the current IA for the slave devices 32',34' is in Modbus Register 1202H.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A translator apparatus comprising:
   a first transceiver adapted to interface a first communication network having a register map of values;
   a second transceiver adapted to interface a second communication network having a plurality of slave devices, said slave devices having a plurality of different maps of objects and commands; and
   a processor comprising:
      a first interface to said first transceiver,
      a second interface to said second transceiver, and
      a communication routine adapted to:
         receive a request based upon said register map through the first transceiver related to at least one of the objects of one of the slave devices, said at least one of the objects of one of the slave devices being responsive to a first command, said at least one of the objects of another one of the slave devices being responsive to a different second command,
         send a command through the second transceiver related to said at least one of the objects of one of the slave devices, said command being selected from a corresponding one of the maps of objects and commands,
         receive a response based upon said command through the second transceiver related to said at least one of the objects of one of the slave devices, and
         send a response based upon said register map through the first transceiver related to said at least one of the objects of one of the slave devices.

2. The translator apparatus of claim 1 wherein said first communication network is a Modbus RTU network.

3. The translator apparatus of claim 1 wherein said second communication network is an INCOM network.

4. The translator apparatus of claim 1 wherein said second communication network is a Modbus RTU network.

5. The translator apparatus of claim 2 wherein said second communication network is an INCOM network.

6. The translator apparatus of claim 2 wherein said second communication network is a Modbus RTU network.

7. The translator apparatus of claim 1 wherein said slave devices include a first slave device having a first map of objects and commands and a second slave device having a different second map of objects and commands.

8. The translator apparatus of claim 7 wherein said slave devices include a third slave device having a third map of objects and commands, said third map being different than said first and second maps.

9. The translator apparatus of claim 1 wherein said slave devices are selected from the list comprising: an electrical interrupting device, a circuit breaker, a digital meter, a motor overload relay, and a monitoring unit.

10. The translator apparatus of claim 3 wherein said INCOM network includes a plurality of commands operatively associated with said slave devices; and wherein said communication routine is further adapted to receive a request through the first transceiver based upon one of said commands.

11. The translator apparatus of claim 1 wherein said communication routine is further adapted to read an object from one of the slave devices, and to send said read object in said response based upon said register map through the first transceiver.

12. The translator apparatus of claim 1 wherein said communication routine is further adapted to receive an object in said request based upon said register map through the first transceiver, and to write said object to one of the slave devices through the second transceiver.

13. A translator apparatus comprising:
   a first transceiver adapted to interface a Modbus RTU network having a first register map of values;
   a second transceiver adapted to interface a slave communication network having a plurality of slave devices, said slave devices having at least one second register map of values, said second register map being different from said first register map of values; and
   a processor comprising:
      a first interface to said first transceiver,
      a second interface to said second transceiver, and
      a communication routine adapted to:
         receive a request based upon said first register map through the first transceiver related to at least one of the values of one of the slave devices, said at least one of the values of one of the slave devices having a first position in the first register map and a second different position in the second register map, send a request based upon said second register map through the second transceiver related to said at least one of the values of one of the slave devices, receive a response based upon said second register map through the second transceiver related to said at least one of the values of one of the slave devices, and send a response based upon said first register map through the first transceiver related to said at least one of the values of one of the slave devices.

14. The translator apparatus of claim 13 wherein said slave communication network is a second Modbus RTU network.

15. The translator apparatus of claim 13 wherein said slave devices include a first slave device having said first register map of values and a second slave device having said second register map of values.

16. The translator apparatus of claim 15 wherein said slave devices include a third slave device having a third register map of values, said third register map being different than said first and second register maps of values.

17. The translator apparatus of claim 13 wherein said request based upon said first register map is related to a plurality of the values of one of the slave devices, said values of one of the slave devices having first positions in the first register map and having second different positions in the second register map.

* * * * *